United States Patent
Tang et al.

(10) Patent No.: US 12,002,014 B2
(45) Date of Patent: Jun. 4, 2024

(54) SOFT MEASUREMENT METHOD FOR DIOXIN EMISSION CONCENTRATION IN MUNICIPAL SOLID WASTE INCINERATION PROCESS

(71) Applicant: BEIJING UNIVERSITY OF TECHNOLOGY, Beijing (CN)

(72) Inventors: Jian Tang, Beijing (CN); Junfei Qiao, Beijing (CN); Zihao Guo, Beijing (CN); Haijun He, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 974 days.

(21) Appl. No.: 16/967,408

(22) PCT Filed: Dec. 2, 2019

(86) PCT No.: PCT/CN2019/122326
§ 371 (c)(1),
(2) Date: Aug. 4, 2020

(87) PCT Pub. No.: WO2020/192166
PCT Pub. Date: Oct. 1, 2020

(65) Prior Publication Data
US 2021/0233039 A1      Jul. 29, 2021

(30) Foreign Application Priority Data
Mar. 24, 2019   (CN) .......................... 201910224790.4

(51) Int. Cl.
*G06Q 10/30*   (2023.01)
*G05B 13/02*   (2006.01)
(Continued)

(52) U.S. Cl.
CPC .......... *G06Q 10/30* (2013.01); *G05B 13/027* (2013.01); *G05B 13/042* (2013.01); *G05B 13/048* (2013.01); *G06N 20/10* (2019.01)

(58) Field of Classification Search
None
See application file for complete search history.

(56) References Cited

U.S. PATENT DOCUMENTS

2009/0193936 A1     8/2009 Lu et al.

FOREIGN PATENT DOCUMENTS

| CN | 103455635 A | 12/2013 | |
| CN | 107944173 A | * 4/2018 | ............. G06F 30/20 |

(Continued)

OTHER PUBLICATIONS

JP2001242154A, translation (Year: 2001).*
CN108549792A, translation (Year: 2018).*
CN107944173A, translation (Year: 2018).*

*Primary Examiner* — Lina Cordero
(74) *Attorney, Agent, or Firm* — Leonid Kisselev

(57) ABSTRACT

Disclosed is a soft measurement method of DXN emission concentration based on multi-source latent feature selective ensemble (SEN) modeling. First, MSWI process data is divided into subsystems of different sources according to industrial processes, and principal component analysis (PCA) is used to separately extract the subsystems' latent features and conduct multi-source latent feature primary selection according to the threshold value of the principal component contribution rate preset by experience. Using mutual information (MI) to evaluate the correlation between the latent features of the primary selection and DXN, and adaptively determine the upper and lower limits and thresholds of the latent feature reselection; finally, based on the reselected latent features, a least squares-support vector machine (LS-SVM) algorithm with a hyperparameter adap-
(Continued)

tive selection mechanism is used to establish DXN emission concentration sub-models for different subsystems, and based on branch and bound (BB) and prediction error information entropy weighting algorithm to optimize the selection of sub-models and calculation weights coefficient, a SEN soft measurement model of DXN emission concentration is constructed.

4 Claims, 14 Drawing Sheets

(51) Int. Cl.
*G05B 13/04* (2006.01)
*G06N 20/10* (2019.01)

(56) References Cited

FOREIGN PATENT DOCUMENTS

| | | | | |
|---|---|---|---|---|
| CN | 107944173 A | | 4/2018 | |
| CN | 108549792 A | * | 9/2018 | ............. G16C 20/10 |
| CN | 108549792 A | | 9/2018 | |
| CN | 109960873 | | 7/2019 | |
| JP | 2001242154 A | * | 9/2001 | |

* cited by examiner

SOFT MEASUREMENT METHOD FOR DIOXIN EMISSION CONCENTRATION IN MUNICIPAL SOLID WASTE INCINERATION PROCESS

CROSS REFERENCE TO RELATED APPLICATION

This application is a national stage application of international application number PCT/CN2019/122326, filed Dec. 2, 2019, titled "Soft Measurement Method for Dioxin Emission Concentration In Municipal Solid Waste Incineration Process", which claims the priority benefit of Chinese Patent Application No. 201910224790.4, filed on Mar. 24, 2019, which is hereby incorporated by reference in its entirety.

TECHNICAL FIELD

The invention relates to the field of solid waste incineration in general, in particular to a soft measurement method of dioxin emission concentration in municipal solid waste incineration (MSWI) process.

BACKGROUND

Reducing energy consumption and pollution emissions of complex industrial processes based on operational optimization control strategies is a challenge that many industrial process enterprises are facing. Incineration is the main technical solution for municipal solid waste (MSW) treatment. For MSW incineration (MSWI) companies in developing countries, the most pressing issue is how to control the pollution emissions caused by incineration. Among them, the emission of dioxin (DXN), which has "not-in-my-backyard effect" and "bio-accumulative effects," commands the highest urgency for emission control from MSWI plants. The main concern of MSWI companies is how to minimize DXN emissions based on optimized operating parameters. At present, setting aside the use of advanced flue gas treatment devices, industrial processes generally adopt the following indirect strategies to control DXN emissions, that is, the "3T1E" criterion with the temperature (T) above 850° C. in the incinerator, more than 2 seconds (T) flue gas residence time, greater degree of turbulence (T) and appropriate excess air coefficient (E). At present, MSWI companies cannot perform operation optimization and feedback control with the direct goal of reducing DXN emissions. The main reasons are: firstly, the first principal model of DXN emission concentration is difficult to build; secondly, offline direct detection based on monthly or seasonal cycles cannot provide real-time feedback of DXN emission concentration. In recent years, research hotspots are turned to indicators/associated substances for online indirect detection of DXN emissions, but the detection equipment is complex with high cost, and the detection lag of these methods make it difficult to use for the operation of MSWI process's optimization and feedback control.

Data-driven soft measurement techniques can be used for online estimation of difficult-to-measure process parameters (such as dioxins in the present invention) that require offline detection. For the MSWI process, Chang et al. used small sample data collected by European and American research institutions for different types of incinerators many years ago, and built a DXN emission concentration soft measurement model based on linear regression, artificial neural network (ANN) and other algorithms. (Chang N B, Huang S H. Statistical modelling for the prediction and control of PCDDs and PCDFs emissions from municipal solid waste incinerators, Waste Management & Research, 1995, 13: 379-400. Chang N B, Chen W C. Prediction of PCDDs/PCDFs emissions from municipal incinerators by genetic programming and neural network modeling, Waste Management & Research, 2000, 18(4):41-351.) In recent years, Bunsan S, combined correlation analysis, principal component analysis (PCA) and ANN and other algorithms to build a DXN emission prediction model based on MSWI process data; (Bunsan S, Chen W Y, Chen H W, Chuang Y H, Grisdanurak N. Modeling the dioxin emission of a municipal solid waste incinerator using neural networks, Chemosphere, 2013, 92: 258-264.) However, ANN is not suitable for building a DXN concentration emission model, mainly because of its inherent shortcomings of easy to fall into local minimum, easy to overfit and poor generalization performance for modeling small sample data. Support vector machine (SVM) algorithm with appropriate hyperparameters can be effectively used for small sample data modeling. To solve the problem of quadratic programming for SVM requirements, the least squares-support vector machine (LS-SVM) overcame it by solving linear equations; the hyperparameters of the model can be obtained by single-objective or multi-objective optimization of algorithms solving, but these methods are time-consuming and can only obtain suboptimal solutions. Therefore, the current research lacks an adaptive mechanism for effective selection of hyperparameters.

Generally, the MSWI process includes multiple subsystems composed of solid waste storage and transportation, solid waste incineration, steam power generation, and flue gas treatment. The process variables involved hundreds of dimensions, and the DXN generation, absorption, and re-synthesis mechanism processes is relevant in varying degrees. Li D C et al. pointed out that the increase in model input dimension and the increase in low-value training samples make it difficult to obtain a sufficient number of training samples. (Li D C, Liu C W. Extending attribute information for small data set classification. IEEE Transactions on Knowledge and Data Engineering, 2010, 24(3): 452-464.) In the field of pattern recognition, it is generally believed that the ratio of the number of training samples to features should be 2, 5, or 10. Tang et al. defines the ratio of training samples and reduction features after dimensionality reduction, and believes that this value should meet the requirements of constructing a robust predictive learning model. (Tang J, Qiao J F, Chai T Y, et al. Multi-component mechanical signal modeling based on virtual sample generation technology, Acta Automatica Sinica, 2018, 44(9): 1569-1589.) Therefore, for the DXN emission concentration modeling data with high dimensional characteristics of small samples, it is necessary to carry out dimensionality reduction. The features obtained based on the unsupervised feature extraction method, although containing the main changes in the original high-dimensional input features, extracted features may be independent of parameters to be predicted. Principal component analysis (PCA), which can extract changes in high-dimensional data, is currently the most commonly used method for latent feature extraction in soft measurement of difficult-to-measure parameters in industrial processes, but a low contribution rate of the principal component (PC) will lead to poor prediction stability.

From another perspective, features extracted for different subsystems of the MSWI process can be viewed as multi-source information from multiple views. Theoretical and empirical analysis shows that the soft measurement model constructed by the selective ensemble (SEN) learning mechanism for multi-source information has better prediction stability and robustness, and the diversities between the sub-models are particularly important. Gavin Brown et al. summarizes the ensemble construction strategy for increase diversity of ensemble sub-models, and points out that training sample resampling strategy includes dividing training samples (sample space), dividing or transforming input features (feature space), etc., the construction strategy based on feature space is superior to the construction strategy based on multiple classifiers in terms of model prediction performance. (Brown G, Wyatt J, Harris R, Yao X. Diversity creation methods: a survey and categorisation. Information Fusion, 2005, 6: 5-20.) For small sample multi-source high-dimensional spectral data, Tang et al. proposed a SEN projection to latent structure model based on selective fusion of multi-source features and multi-conditions samples; Zhou et al and Tang et al proposed a random-based sampling sample space SEN neural network model and projection to latent structure model. (Zhou Z H, Wu J and Tang W, Ensembling neural networks: many could be better than all," Artificial Intelligence, 2002, 137(1-2): 239-263; Tang J, Chai T Y, Yu W, Liu Z, Zhou X J. A Comparative study that measures ball mill load parameters through different single-scale and multi-scale frequency spectra-based approaches, IEEE Transactions on Industrial Informatics, 2016, 12(6): 2008-2019.) Ma et al proposes a general framework for ensemble learning based on subspace. (Ma G, Wu L, Wang Y. A general subspace ensemble learning framework via totally-corrective boosting and tensor-based and local patch-based extensions for gait recognition. Pattern Recognition, 2017, 66: 280-294.) Tang et al proposes a two-layer SEN projection to latent structure model in multi-scale mechanical signal oriented random sampling sample space in feature subspace. (Tang J, Qiao J F, Wu Z W, Chai T Y, ZhangJ, Yu W. Vibration and acoustic frequency spectra for industrial process modeling using selective fusion multi-condition samples and multi-source features. Mechanical Systems and Signal Processing, 2018, 99:142-168.) The SEN neural network model proposed by S. Soares et al constructs candidate sub-models for optimization perspective and ensemble sub-models for optimization selection respectively and their weights. (Soares C, Antunes C H, AraUjo R, Comparison of a genetic algorithm and simulated annealing for automatic neural network ensemble development, Neurocomputing, 2013, 21(9):.498-511.) However; none of the above methods involves or adopts the modeling parameter adaptation mechanism. In summary, with the measurement and reselection of unsupervised latent features as input, the SEN-LS-SVM modeling strategy based on the adaptive hyperparameter selection mechanism and its research in soft measurement of DXN emission concentration have not been reported.

SUMMARY

The present disclosure provides a multi-source latent feature SEN-based soft measurement method for DXN emission concentration in MSWI process. First, the latent feature extraction and primary selection module is used to divide the MSWI process data into subsystems of different sources according to industrial processes. Principal component analysis (PCA) is used to separately extract the subsystems' latent features and conduct multi-source latent feature primary selection according to the threshold value of the principal component contribution rate preset by experience. Subsequently, the latent feature evaluation and reselection module uses mutual information (MI) to measure the correlation between the latent features of the primary selection and the DXN, and adaptively determine the upper and lower limits and thresholds of latent feature reselection. Finally, based on the reselection latent features, the adaptive selective ensemble modeling module uses a least squares-support vector machine (LS-SVM) algorithm with a hyper-parameter adaptive selection mechanism and establishes DXN emission concentration sub-models for different sub-systems; adopts the strategy based on branch and bound (BB) and prediction error information entropy weighting algorithm to optimize the selection of sub-models and calculate the weight coefficients, to build a DXN emission concentration SEN soft measurement model.

DETAILED DESCRIPTION OF THE PREFERRED EMBODIMENTS

MSWI Description for DXN Emission Process

MSWI's main equipment includes incinerator, mobile grate, waste boliler and flue gas treatment equipment, among which: incinerator converts MSW into residue, dust, flue gas and heat, and mobile grate located at the bottom of incinerator makes MSW effective and complete combustion, the steam generated by the waste boiler is used to drive the steam turbine to generate electricity, and the dust and pollutants in the flue gas are purified by the flue gas treatment equipment and discharged into the atmosphere. The process is shown in FIG. 1.

Figure 1:
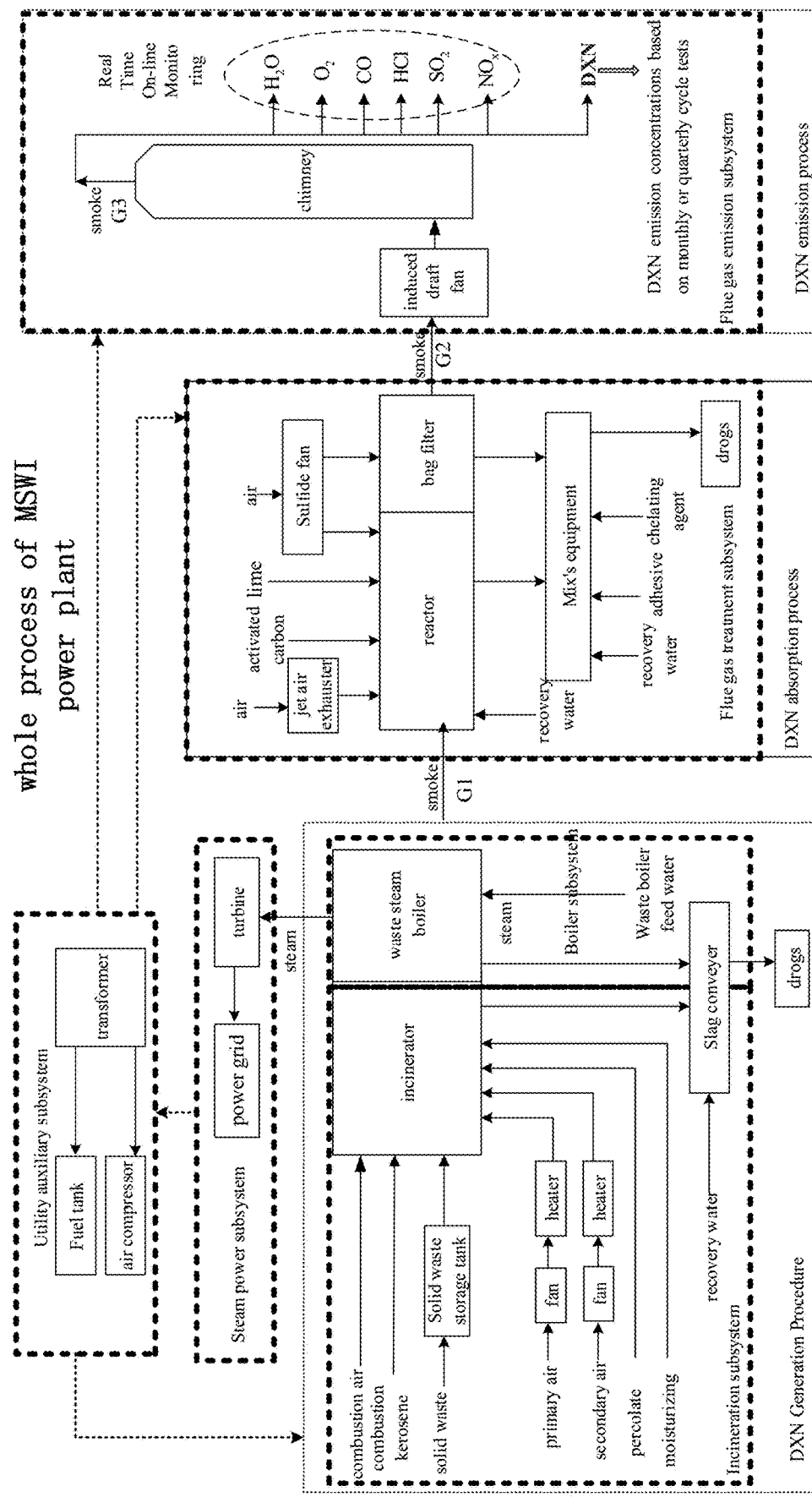
FIG. 1 is a diagram showing a MSWI process description based on DXN perspective.

As can be seen from FIG. 1, from the perspective of pollution emissions, the MSWI process includes three stages of DXN: generation, absorption and emission, which are included in the flue gas labeled G1, G2 and G3, respectively. Obviously, the concentration of DXN contained in the flue gas of these different stages is different. Generally, in order to ensure that the harmful substances in the incinerator can be effectively and completely decomposed, the temperature of the flue gas should reach at least 850° C. for more than 2 seconds. The primary air used for MSW incineration is injected from the bottom of the grate while cooling the grate, and by introducing turbulence and ensuring the supply of excess oxygen, the secondary air can assist the complete combustion of flue gas. During the cooling of flue gas, the disposal and collection of incineration slag and waste pot bottom ash are carried out, and flue gas G1 is discharged at the same time. Activated carbon and lime are injected into the reactor to remove acid gases and absorb DXN and some heavy metals, and the flue gas then enters the bag filter. Fly ash generated in the reactor and bag filter is injected into the mixing equipment, and flue gas G2 is generated at the same time. Induced draft fan sucks the flue gas G2 into stack and discharges it into the air as flue gas G3, including HCL, $SO_2$, NOx, HF and other pollutant concentrations that can be detected online in real time, and offline testing concentration DXN which has the characteristics of long cycle and high cost. It can be seen from the above description that the DXN emission concentration is correlated with easily detectable process variables at different stages of MSWI process.

As can be seen from FIG. 1, MSWI process can be divided into six subsystems: incineration, boiler, flue gas treatment, steam power generation, stack emission, and common engineering. For DXN emission concentration modeling, the present invention treats multiple subsystems as multi-source information.

Modeling Strategy

In the present invention, model input data $X \in R<N \times M>$ includes N samples (rows) and M variables (columns), which are derived from different subsystems of the MSWI process. Represent the modeling data from the "ith" subsystem as $X^i \in R^{N \times M^i}$, that is, the following relationship exists:

$$X = [X^1, L, X^i, L, X^I] = \{X^i\}_{i=1}^{I} \quad (1)$$

$$M = M^1 + L + M^i + L + M^I = \sum_{i=1}^{I} M^i \quad (2)$$

Wherein, I represents the number of subsystems, $M^i$ represents the number of variables contained in the ith subsystem. Correspondingly, the output data $y=\{y_n\}_{n=1}^{N}$ includes N samples (rows), which are derived from the DXN emission concentration detection data of offline testing. Obviously, the input/output data has great differences on the time scale: the process variables are collected and stored in DCS system in seconds, and DXN emission concentration is obtained by offline testing on a monthly/quarterly cycle, so that N=M.

Figure 2:
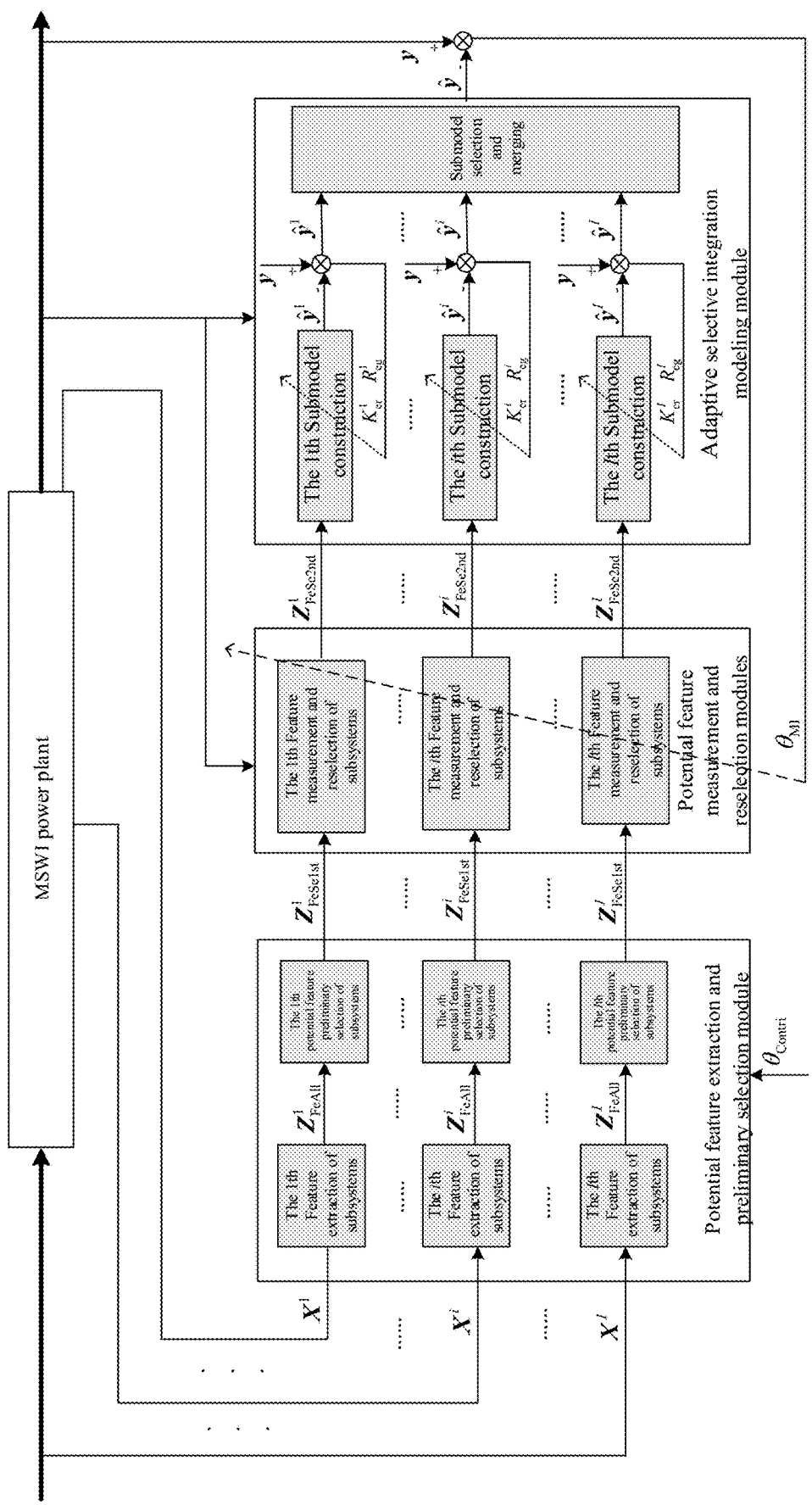
FIG. 2 is a diagram showing DXN emission concentration soft measurement strategy based on latent feature SEN modeling.

Based on the above situation, the present invention proposes a soft measurement method of DXN emission concentration based on latent feature SEN modeling, including latent feature extraction and primary selection module, latent feature evaluation and reselection module, adaptive selective ensemble modeling module, such as FIG. 2 shows.

In FIG. 2, $X^i \in R^{N \times M^i}$ represents all process variables collected from the ith subsystem; $Z_{FeAll}^i \in R^{N \times M_{FeAll}^i}$ represents all latent features extracted by PCA for all process variables of ith subsystem; $Z_{FeSe1st}^i \in R^{N \times M_{FeSe1st}^i}$ means that all the latent features of the ith subsystem are selected according to the set threshold $\theta_{Contri}$. The number of selected latent features is $M_{FeSe1st}^i$, $Z_{FeSe2nd}^i \in R^{N \times M_{FeSe2nd}^i}$ means that the latent features of the ith subsystem are selected for mutual information (MI) after the evaluation, number of re-selected latent features based on the threshold $\theta_{MI}$ is $M_{FeSe2nd}^i$; $K_{er}^i$ and $R_{eg}^i$ represent the kernel parameters and regularization parameters selected for the ith sub-model based on LS-SVM, which called hyperparameter pair, the present invention records it as $\{K_{er}^i, R_{eg}^i\}$ to represent the predicted output of the ith sub-model; y and ŷ represent the true value and predicted output of the DXN emission concentration soft measurement model.

The functions of the above modules are:

(1) Latent feature extraction and primary selection module: PCA is used to extract all the latent features of process variables collected from different subsystems, and the multi-source primary selection latent features are obtained based on the threshold of latent feature contribution rate which is set based on experience, the purpose of which is to prevent unstable performance caused by small latent characteristics of the contribution rate.

(2) Latent feature evaluation and reselection module: use mutual information (MI) to evaluate the relationship between primary selected latent features of different subsystems and DXN emission concentration, then combine adaptively determined threshold value based on the soft measurement model prediction performance to obtain the reselected latent feature, The purpose is to make the selected multi-source latent features have a good mapping relationship with DXN emission concentration.

(3) Adaptive selective ensemble modeling module: adopting hyper-parameter adaptive selection strategy to build sub-models with the best prediction performance for different subsystems, combining branch and bound (BB) and prediction error information entropy weighting algorithm to adaptively select sub-models. The purpose of the model and the calculation of its weighting coefficients is to select latent features with better redundancy and complementarity to construct sub-models for fusion to improve the prediction performance of SEN soft measurement model.

Latent Feature Extraction and Primary Selection Module

Taking the ith subsystem as an example, PCA is first used to extract the latent features of high-dimensional input process variables. input data $X^i$ is normalized to zero mean 1 variance, it is decomposed into:

$$X^i = t_{1_{FeAll}}{}^i (p_{1_{FeAll}}{}^i)^T + L + t_{m_{FeAll}}{}^i (p_{m_{FeAll}}{}^i)^T + L + t_{M_{FeAll}}{}^i (p_{M_{FeAll}}{}^i)^T \quad (3)$$

Wherein, $t_{m_{FeAll}}{}^i$ and $p_{m_{FeAll}}{}^i$ represent the score and load vector of $m_{FeAll}{}^i$th principal component (PC), T represents the transpose, and $M_{FeAll}{}^i$ represents the number of latent features extracted for the ith subsystem, and its calculation formula as follows:

$$M_{FeAll}{}^i = \text{rank}(X^i) \quad (4)$$

Based on the above expression, all the latent features extracted from the data $X^i$ can be expressed as:

$$T^i = [t_{1_{FeAll}}{}^i, L, t_{m_{FeAll}}{}^i, L, t_{M_{FeAll}}{}^i] \quad (5)$$

wherein, $T^i \in R^{N \times M_{FeAll}{}^i}$ represents the score matrix, which is the orthogonal mapping of the data $X^i$ in the direction of the load matrix $P^i$; $P^i$ is expressed by the following formula:

$$P^i = [p_{1_{FeAll}}{}^i, L, p_{m_{FeAll}}{}^i, L, p_{M_{FeAll}}{}^i] \quad (6)$$

wherein $P^i \in R^{M \times M_{FeAll}{}^i}$.

Therefore, the latent features extracted from the data $X^i$ can be expressed as, $$\begin{aligned} Z^i_{FeAll} &= T^i = X^i P^i \\ &= \left[ Z^i_{1_{FeAll}}, L, z^i_{m^i_{FeAll}}, L, Z^i_{M^i_{FeAll}} \right] \\ &= \left[ \left\{ \left( z^i_{1_{FeAll}} \right)_n \right\}_{n=1}^N, L, \left\{ \left( z^i_{m^i_{FeAll}} \right)_n \right\}_{n=1}^N, L, \left\{ \left( z^i_{M^i_{FeAll}} \right)_n \right\}_{n=1}^N \right] \\ &= \left\{ \left( z^i_{FeAll} \right)_n \right\}_{n=1}^N \end{aligned} \quad (7)$$

Wherein $Z_{FeAll}{}^i \in R^{N \times M_{FeAll}{}^i}$.

Further, all latent features can be expressed as:

$$Z_{FeAll} = [Z_{FeAll}{}^1, L, Z_{FeAll}{}^i, L, Z_{FeAll}{}^I] = \{Z_{FeAll}{}^i\}_{i=1}^I \quad (8)$$

Studies have shown that modeling with latent variables with a small contribution rate can lead to instability in model prediction performance.

The feature vector corresponding to the $m_{FeAll}{}^i$th load vector $P_{m_{FeAll}}{}^i$ is recorded as $\lambda_{m_{FeAll}}{}^i$ and the corresponding $m_{FeAll}{}^i$th latent feature $z_{m_{FeAll}}{}^i$ contribution rate $\theta_{m_{FeAll}}{}^i$ is calculated using the following formula:

$$\theta^i_{m^i_{FeAll}} = \frac{\lambda^i_{m^i_{FeAll}}}{\sum_{m^i_{FeAll}=1}^{M^i_{FeAll}} \lambda^i_{m^i_{FeAll}}} \times 100 \quad (9)$$

The threshold selected according to experience is recorded as $\theta_{Contri}$, and its default value is 1. Use the following rules to select all latent features for the first time:

$$\xi^i_{m^i_{FeAll}} = \begin{cases} 1, & \text{if } \theta^i_{m^i_{FeAll}} \geq \theta_{Contri} \\ 0, & \text{else } \theta^i_{m^i_{FeAll}} < \theta_{Contri} \end{cases} \quad (10)$$

wherein, $\xi_{m_{FeAll}}{}^i$ represents the mark value of whether the $m_{FeAll}{}^i$th latent feature is selected, and the value of 1 indicates that the latent feature is selected for the first time.

Therefore, the latent features of the primary selection for the ith subsystem are expressed as:

$$\begin{aligned} Z^i_{FeSe1st} &= \left[ z^i_{1FeSe1st}, L, z^i_{m^i_{FeSe1st}}, L, z^i_{M^i_{FeSe1st}} \right] \\ &= \left[ \left\{ \left( z^i_{1FeSe1st} \right)_n \right\}_{n=1}^N, L, \left\{ \left( z^i_{m^i_{FeSe1st}} \right)_n \right\}_{n=1}^N, L, \left\{ \left( z^i_{M^i_{FeSe1st}} \right)_n \right\}_{n=1}^N \right] \\ &= \left\{ \left( z^i_{FeSe1st} \right)_n \right\}_{n=1}^N \end{aligned} \quad (11)$$

Further, all latent features of the primary selection $Z_{FeSe1st}$ can be expressed as:

$$Z_{FeSe1st} = [Z_{FeSe1st}{}^1, L, Z_{FeSe1st}{}^i, L, Z_{FeSe1st}{}^I] = \{Z_{FeSe1st}{}^i\}_{i=1}^I \quad (12)$$

Latent Feature Evaluation and Reselection Module

The preliminary selected latent features obtained in the previous step are extracted using unsupervised methods, and the features contained in the same subsystem are independent of each other, but the correlation between these features and DXN emission concentration is not considered, that is, high contribution latent features are not necessarily strongly correlated with DXN. Take the ith subsystem as an example, the mutual information (MI) value between each primary feature $z_{m_{FeSe1st}}{}^i$ and the DXN emission concentration is marked as $\xi_{MI}^{m_{FeSe1st}^i}$ and calculated using the following formula:

$$\begin{aligned} \xi_{MI}^{m^i_{FeSe1st}} = \\ \int\int p_{prob}\left(z^{m^i_{FeSe1st}}, y\right) \log\left(\frac{p_{prob}\left(z^{m^i_{FeSe1st}}, y\right)}{p_{prob}\left(z^{m^i_{FeSe1st}}\right)p_{prob}(y)}\right) d\left(z^{m^i_{FeSe1st}}\right) dy = \\ H(y) - H\left(y \mid z^{m^i_{FeSe1st}}\right) \end{aligned} \quad (13)$$

Wherein, $p_{prob}(z^{m_{FeSe1st}^i})$ and $p_{prob}(y)$ represent the marginal probability density of $z^{m_{FeSe1st}^i}$ and y; $p_{prob}(z^{m_{FeSe1st}^i}, y)$ represents the joint probability density; $H(y|z^{m_{FeSe1st}^i})$ represents the conditional entropy, and $H(y)$ represents the information entropy.

The threshold is adaptively determined according to prediction performance of the soft measurement model. The upper limit of the threshold $\theta_{Contri}^{Uplimit}$ the lower limit of $\theta_{Contri}^{Downlink}$ and the fixed step size $\theta_{Contri}^{Step}$ are calculated using the following formula:

$$\theta_{Contri}^{Uplimit} = \min\left(\max\left(\xi_{MI}^{m^1_{FeSe1st}}\right), L, \max\left(\xi_{MI}^{m^i_{FeSe1st}}\right), L\max\left(\xi_{MI}^{m^I_{FeSe1st}}\right)\right) \quad (14)$$

$$\theta_{Contri}^{Downlimit} = \max\left(\min\left(\xi_{MI}^{m^1_{FeSe1st}}\right), L, \min\left(\xi_{MI}^{m^i_{FeSe1st}}\right), L\min\left(\xi_{MI}^{m^I_{FeSe1st}}\right)\right) \quad (15)$$

$$\theta_{Contri}^{Step} = \frac{\theta_{Contri}^{Uplimit} - \theta_{Contri}^{Downlimit}}{N_{Contri}^{Step}} \quad (16)$$

Wherein, the functions $\max(\bullet)$ and $\min(\bullet)$ represent the maximum and minimum values respectively; $N_{Contri}^{Step}$ represents the number of candidate thresholds determined based on experience, and the default value is 10.

The selected threshold is recorded as $\theta_{Contri}$, and its value is adaptively selected between $\theta_{Contri}^{Uplimit}$ and $\theta_{Contri}^{Downlimit}$ based on the prediction performance of the DXN soft measurement model.

Use the following rules to reselect the latent features of the primary selection:

$$\xi^i_{m^i_{FeSe1st}} = \begin{cases} 1, & \text{if } \xi^{m^i_{FeSe1st}}_{MI} \geq \theta_{Contri} \\ 0, & \text{else } \xi^{m^i_{FeSe1st}}_{MI} < \theta_{Contri} \end{cases} \quad (17)$$

Wherein, $\xi^i_{m_{FeSe1st}}$ represents the mark value of whether the $m_{FeSe1st}$th latent feature is selected, and the value of 1 indicates that the latent feature is selected again.

Further, express the reselected latent features for the ith subsystem as:

$$Z^i_{FeSe2nd} = \left[ z^i_{1_{FeSe2nd}}, L, z^i_{m^i_{FeSe2nd}}, L, z^i_{M^i_{FeSe2nd}} \right] \quad (18)$$

$$= \left[ \{(z^i_{1_{FeSe2nd}})_n\}_{n=1}^N, L, \{(z^i_{m^i_{FeSe2nd}})_n\}_{n=1}^N, L, \{(z^i_{M^i_{FeSe2nd}})_n\}_{n=1}^N \right]$$

$$= \{(z^i_{FeSe2nd})_n\}_{n=1}^N$$

Therefore, all the re-selected latent features $z_{FeSe2nd}$ can be expressed as:

$$Z_{FeSe2nd} = [Z_{FeSe2nd}^1, L, Z_{FeSe2nd}^i, L, Z_{FeSe2nd}^I] = \{Z_{FeSe2nd}^i\}_{i=1}^I \quad (19)$$

Adaptive Selective Ensemble Modeling Module

Taking the ith subsystem as an example, describe the process of constructing a DXN emission concentration sub-model based on the reselection of latent features $z_{FeSe2nd}$ and model hyperparameter pair $\{K_{er}^i, R_{eg}^i\}$.

First, transform the reselected latent feature $\{(z_{FeSe2nd}^i)_n\}n=1^N$ into a high-dimensional feature space by mapping $\varphi(\cdot)$, and then solve the following optimization problem:

$$\begin{cases} \min_{w^i, b^i} O_{LS-SVM} = \frac{1}{2}(w^i)^T w^i + \frac{1}{2}R_{eg}^i \sum_{n=1}^N (\zeta_n^i)^2 \\ \text{s.t:} \quad \hat{y}_n^i = (w^i)^T \varphi((z_{FeSe2nd}^i)_n) + b^i + \zeta_n^i \end{cases} \quad (20)$$

Wherein, $w^i$ represents the weight coefficient, $b^i$ represents the offset, and $\zeta_n^i$ is the prediction error of the nth sample.

Using Lagrangian method, the following formula can be obtained:

$$L^i(w^i, b^i, \zeta^i, \beta^i) = \quad (21)$$

$$\frac{1}{2}(w^i)^T w^i + \frac{1}{2}\sum_{n=1}^N (\zeta_n^i)^2 - \sum_{n=1}^N \beta_n^i [(w^i)^T \varphi((z_{FeSe2nd}^i)_n) + b^i + \zeta_n^i - \hat{y}_n^i]$$

Wherein, $\beta^i = [\beta_1^i, L, \beta_n^i, L, \beta_N^i]$ represents the Lagrange operator vector, and $\zeta^i = [\zeta_1^i, L, \zeta_n^i, L, \zeta_N^i]$ represents the prediction error vector.

Calculate the above formula:

$$\frac{\partial L^i}{\partial w^i} = 0, \frac{\partial L^i}{\partial b^i} = 0, \frac{\partial L^i}{\partial \zeta^i} = 0, \frac{\partial L^i}{\partial \beta^i} = 0, \quad (22)$$

The adopted kernel function can be expressed as follows:

$$\Omega_{ker}^i(z_{FeSe2nd}^i, (z_{FeSe2nd}^i)_n) = \langle \varphi(z_{FeSe2nd}^i) \cdot \varphi((z_{FeSe2nd}^i)_n) \rangle \quad (23)$$

Further, LS-SVM problem is converted into solving the following linear equation system:

$$\begin{bmatrix} 0 & 1 & L & 1 \\ 1 & \Omega_{ker}^i((z_{FeSe2nd}^i)_1, (z_{FeSe2nd}^i)_1) + \frac{1}{R_{eg}^i} & L & \Omega_{ker}^i((z_{FeSe2nd}^i)_1, (z_{FeSe2nd}^i)_N) \\ M & M & M & M \\ 1 & \Omega_{ker}^i((z_{FeSe2nd}^i)_N, (z_{FeSe2nd}^i)_1) & L & \Omega_{ker}^i((z_{FeSe2nd}^i)_N, (z_{FeSe2nd}^i)_N)) + \frac{1}{R_{eg}^i} \end{bmatrix} \begin{bmatrix} b^i \\ \beta_1^i \\ M \\ \beta_N^i \end{bmatrix} = \begin{bmatrix} 1 \\ y_1^i \\ M \\ y_N^i \end{bmatrix} \quad (24)$$

By solving the above formula, $\beta^i$ and $b^i$ are obtained.

Furthermore, DXN emission concentration sub-model based on LS-SVM can be expressed as:

$$y^i = \sum_{n=1}^N \beta_n^i \cdot \Omega_{ker}^i(z_{FeSe2nd}^i, (z_{FeSe2nd}^i)_n) + b^i \quad (25)$$

Hyperparameter adaptive selection mechanism of the above DXN emission concentration sub-model is implemented using the following two-step method:

The first step is to adopt the grid search strategy with the prediction performance of the sub-model as objective function, and adaptively select the initial hyperparameter pair $\{(K_{er}^{initial})^i, (R_{eg}^{initial})^i\}$ in the candidate hyperparameter matrix $M_{para}$. The hyperparameter matrix $M_{para}$ can be expressed as follows:

$$M_{para} = \begin{bmatrix} [K_{er}^1, R_{eg}^1] & L & [K_{er}^1, R_{eg}^r] & L & [K_{er}^1, R_{eg}^R] \\ M & M & M & M & M \\ [K_{er}^k, R_{eg}^1] & L & [K_{er}^k, R_{eg}^r] & L & [K_{er}^k, R_{eg}^R] \\ M & M & M & M & M \\ [K_{er}^K, R_{eg}^1] & L & [K_{er}^K, R_{eg}^r] & L & [K_{er}^K, R_{eg}^R] \end{bmatrix}_J \quad (26)$$

Where k=1,L,K; K represent the number of candidate kernel parameters; r=1,L,R; R represent the number of candidate penalty parameters; $[K_{er}^k, R_{eg}^r]$ represents the kth kernel parameter and rth penalty parameter. The formed hyperparameter pair is also the jth parameter pair in the hyperparameter matrix $M_{para}$, that is, there are $M_{para}^j = [K_{er}^k, R_{eg}^r]$, j=1,L,J, J=K×R means that all hyperparameter pairs' number in the hyperparameter matrix $M_{para}$. Therefore, the hyperparameter pair $\{(K_{er}^{initial})^i, (R_{eg}^{initial})^i\}$ selected for the first time using the grid search strategy is an element in matrix $M_{para}$, i.e., there is $\{K_{er}^{initial}, R_{eg}^{initial}\} \in M_{para}$. In the second step, based on the $\{(K_{er}^{initial})^i, (R_{eg}^{initial})^i\}$ selected by the above method, a new set of candidate hyperparameters is obtained using the following formula:

$$(K_{er}^{vector})^i = \qquad (27)$$

$$(K_{er}^{initial})^i / k_{supara}^{down} : \frac{k_{supara}^{up} \times (K_{er}^{initial})^i - (K_{er}^{initial})^i / k_{supara}^{down}}{N_{ker}} : k_{supara}^{up} \times (K_{er}^{initial})^i$$

$$(R_{er}^{vector})^i = \qquad (28)$$

$$(R_{eg}^{initial})^i / k_{supara}^{down} : \frac{k_{supara}^{up} \times (R_{eg}^{initial})^i - (R_{eg}^{initial})^i / k_{supara}^{down}}{N_{ker}} : k_{supara}^{up} \times (R_{eg}^{initial})^i$$

Wherein, $(K_{er}^{vector})^i$ and $(R_{eg}^{vector})^i$ represent new candidate hyperparameter sets, corresponding to kernel parameter vector and penalty parameter vector respectively; $N_{ker}$ and $N_{reg}$ represent the number of new hyperparameters set based on experience; $k_{supara}^{down}$ and $k_{supara}^{up}$ represents the hyperparameter shrinkage and expansion factor based on experience, the default value is 10.

By adopting the grid search strategy to adaptively obtain the hyperparameter pair of the ith sub-model $\{K_{er}^i, R_{eg}^i\}$.

Performing the above process on all subsystems, the set of sub-model prediction outputs can be expressed as:

$$\hat{Y} = [\hat{y}^1, L, \hat{y}^i, L, \hat{y}^J] \qquad (29)$$

$$= \{\hat{y}^i\}_{i=1}^I = [f^1(K_{er}^1, R_{eg}^1, Z_{FeSe2nd}^1), L,$$

$$f^i(K_{er}^i, R_{eg}^i, Z_{FeSe2nd}^i), L, f^I(K_{er}^I, R_{eg}^I, Z_{FeSe2nd}^I)]$$

$$= \{f^i(K_{er}^i, R_{eg}^i, Z_{FeSe2nd}^i)\}_{i=1}^I$$

Wherein, $f^i(\cdot)$ represents the ith sub-model.

Combining the optimization selection algorithm based on branch and bound (BB) and the prediction error information entropy weighting algorithm, the above sub-models are adaptively optimized and weighted coefficients are calculated. Given the candidate sub-model and weighting algorithm, the optimal sub-model selection is similar to the weighted optimal feature selection. For a limited number of candidate sub-models, by running optimization and weighting algorithms multiple times, SEN models with integrated sizes of 2 to $^{(I-1)}$ can be obtained, Finally, these optimized SEN models are ranked and the best predicted performance is taken as the final DXN soft measurement model.

Assuming that the ensemble size of final DXN soft measurement model is $I_{sel}$, its predicted output value $\hat{y}$ can be calculated by the following formula:

$$\hat{y} = \sum_{i_{sel}=1}^{I_{sel}} w_{i_{sel}} \hat{y}_{i_{sel}} = \sum_{i_{sel}=1}^{I_{sel}} w_{i_{sel}} \cdot f^{i_{sel}}(K_{er}^{i_{sel}}, R_{eg}^{i_{sel}}, Z_{FeSe2nd}^{i_{sel}}) \qquad (30)$$

Wherein, $f^{i_{sel}}(\cdot)$ represents the $i_{sel}$th sub-model optimized for selection, $w_{i_{sel}}$ and $\hat{y}_{i_{sel}}$ represent their corresponding weighting coefficients and predicted values, $K_{er}^{i_{sel}}$, $R_{eg}^{i_{sel}}$ and $Z_{FeSe2nd}^{i_{sel}}$ represent the hyperparameters and inputs of the sub-model $f^{i_{sel}}(\cdot)$ feature.

Compare with equation (29), there has the following relationship:

$$\begin{cases} \{\hat{y}^{i_{sel}}\}_{i_{sel}=1}^{I_{sel}} \in \{\hat{y}^i\}_{i=1}^I \\ \{f^{i_{sel}}(K_{er}^{i_{sel}}, R_{eg}^{i_{sel}}, Z_{FeSe2nd}^{i_{sel}})\}_{i_{sel}=1}^{I_{sel}} \in \{f^i(K_{er}^i, R_{eg}^i, Z_{FeSe2nd}^i)\}_{i=1}^I \end{cases} \qquad (31)$$

Using predicted value and true value of the sub-model, $w_{i_{sel}}$ is obtained by using a weighting algorithm based on prediction error information, which is shown below:

$$w_{i_{sel}} = \frac{1}{I_{sel} - 1}\left(1 - (1 - E_{i_{sel}}) / \sum_{i_{sel}=1}^{I_{sel}} (1 - E_{i_{sel}})\right) \qquad (32)$$

Wherein:

$$E_{i_{sel}} = \frac{1}{\ln N} \sum_{n=1}^{N}\left((e_{i_{sel}})_n / \left(\sum_{n=1}^{N}(e_{i_{sel}})_n\right)\right) \ln\left((e_{i_{sel}})_n / \left(\sum_{n=1}^{N}(e_{i_{sel}})_n\right)\right) \qquad (33)$$

$$(e_{i_{sel}})_n = \begin{cases} (\hat{y}_{i_{sel}})_n - y_n/y_n, & 0 \le \|(\hat{y}_{i_{sel}})_n - y_n/y_n\| < 1 \\ 1 & |(\hat{y}_{i_{sel}})_n - y_n/y_n| \ge 1 \end{cases} \qquad (34)$$

Wherein, $(\hat{y}_{i_{sel}})_n$ and $(e_{i_{sel}})_n$ represent the prediction value and relative prediction error of the nth sample based on the sub-model $f^{i_{sel}}(\cdot)$ of the $i_{sel}$th optimization selection, and $E_{i_{sel}}$ represents the prediction error of the sub-model of the $i_{sel}$th optimization selection information entropy.

Application Research

The modeling data in the present invention is derived from the 1 #furnace of a grate based MSWI incineration enterprise in Beijing, covering the available DXN emission concentration detection samples recorded from 2012 to 2018, the number of which is 39; the corresponding input variables dimensions is 286 (including all process variables of the MSWI process). It can be seen that the number of input features far exceeds the number of modeling samples, and it is necessary to carry out dimensionality reduction. The invention divides the modeling data into two parts, which are used for training and testing respectively.

In the present invention, six subsystems of incineration, boilers, flue gas treatment, steam power generation, stack emissions, and common engineering are respectively marked as Incineration, Boiler, Flue gas, Steam, Stack, and Common. In order to represent the overall change characteristics of the incineration process variables, the present invention uses the MSWI system containing all variables as a special subsystem for analysis and modeling. Therefore, the present invention contains a total of 7 subsystems.

Latent Feature Extraction and Primary Selection Results

Figure 3:
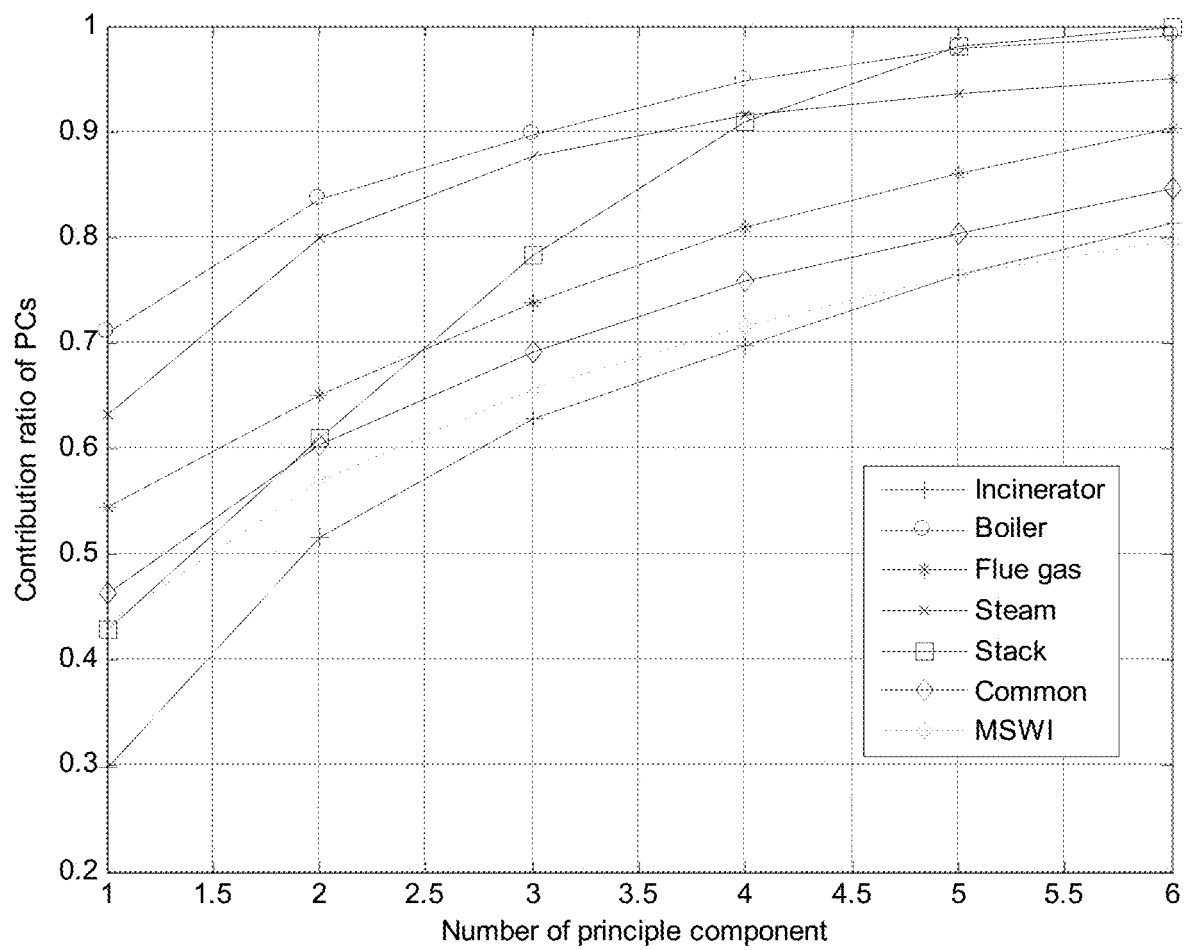
FIG. 3 a diagram showing cumulative contribution rates of the first 6 principle components of different subsystems, in an embodiment.
Figure 4A:
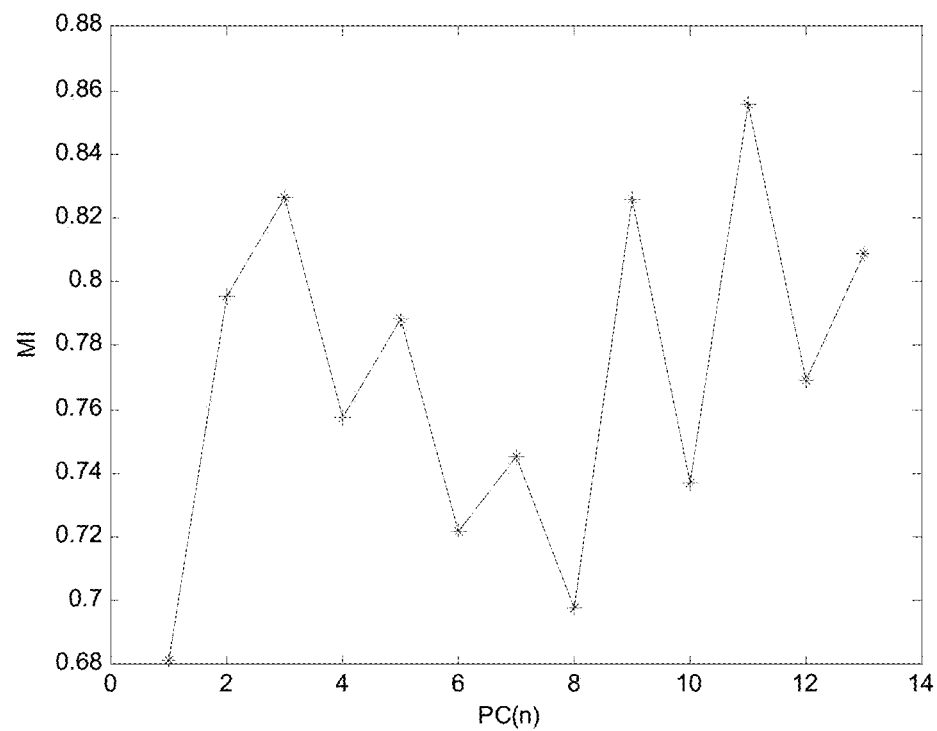
FIG. 4(a) shows MI value between the primarily selected latent features of Incinerator subsystem and DXN.
Figure 4B:
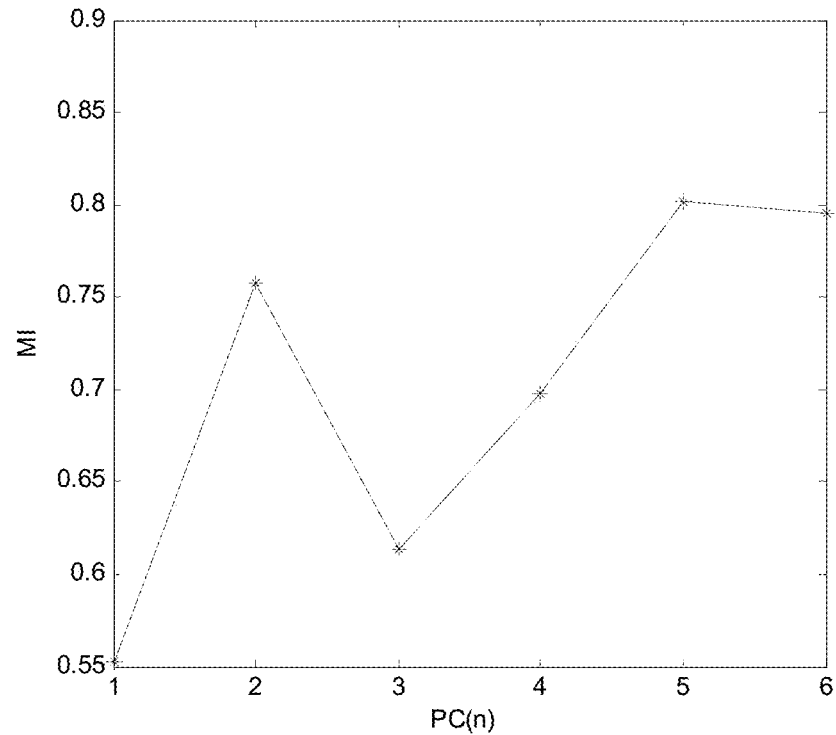
FIG. 4(b) shows MI value between the primarily selected latent features of the Boiler subsystem and the DXN.
Figure 4C:
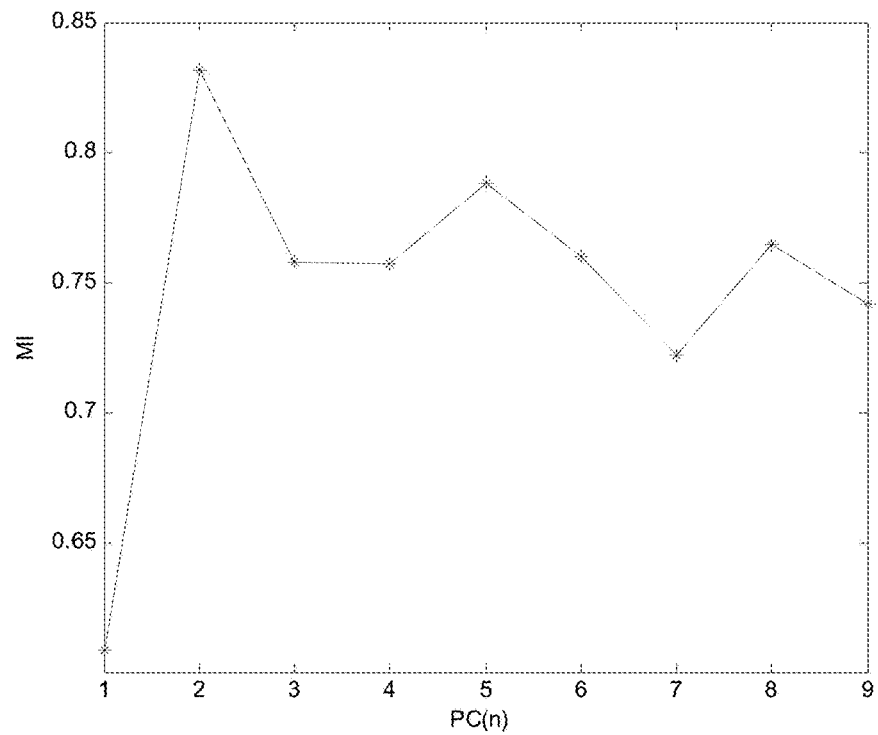
FIG. 4(c) shows MI value between the primarily selected latent features of the Flue gas subsystem and the DXN.
Figure 4D:
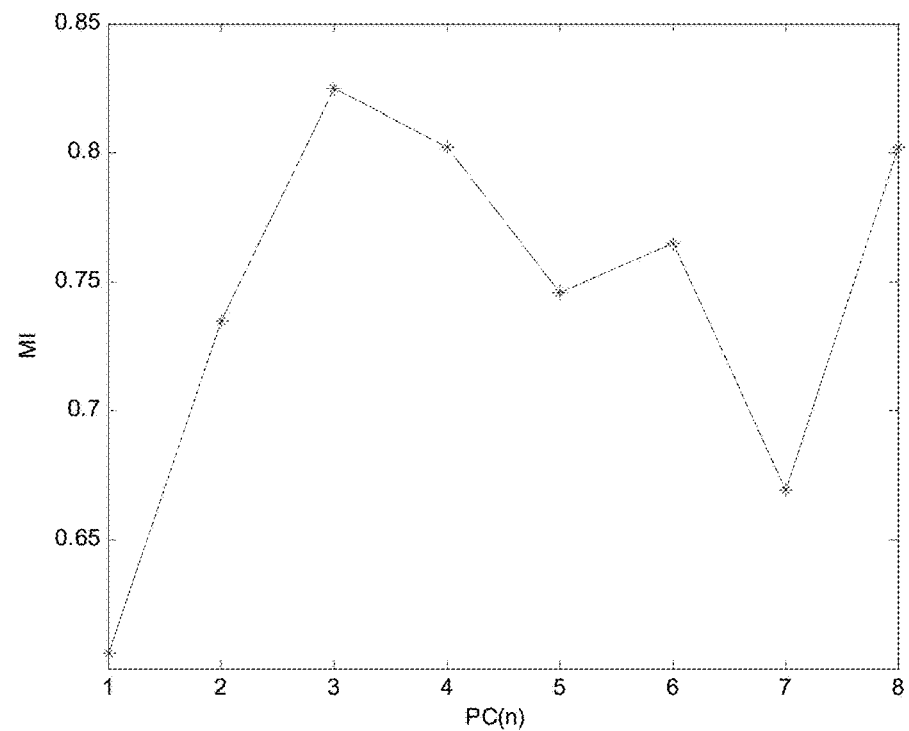
FIG. 4(d) shows MI value between the primarily selected latent features of the Steam power generation subsystem and the DXN.
Figure 4E:
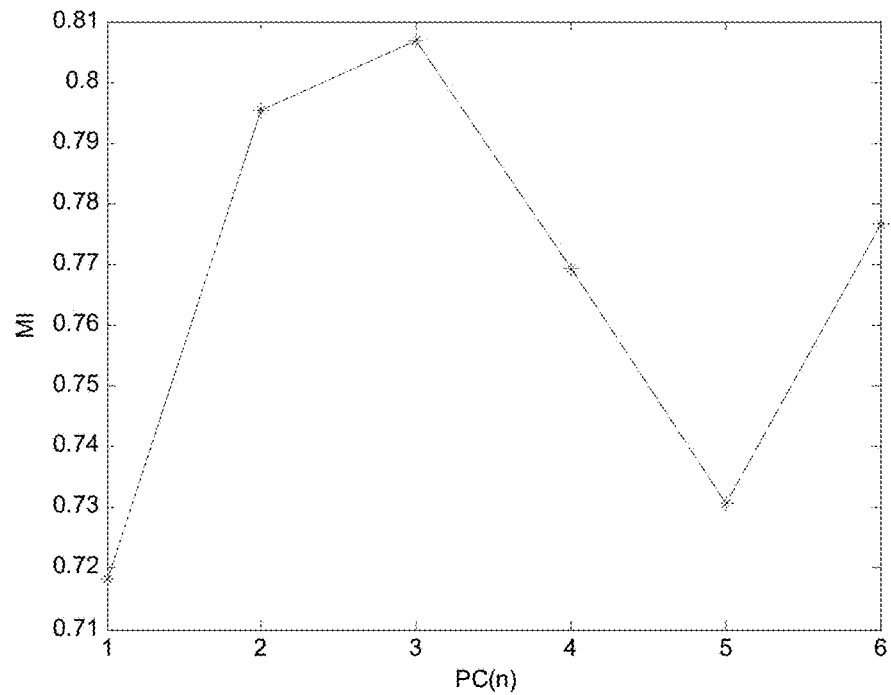
FIG. 4(e) shows MI value between the primarily selected latent features of the Stack emission subsystem and the DXN.
Figure 4F:
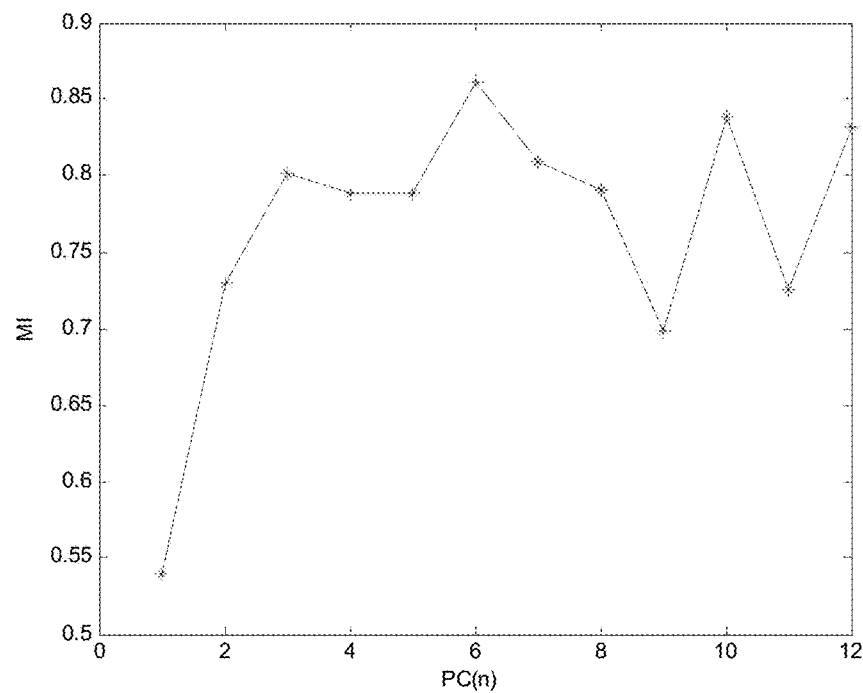
FIG. 4(f) shows MI value between the primarily selected latent features of the Common engineering subsystem primary selection and DXN.
Figure 4G:
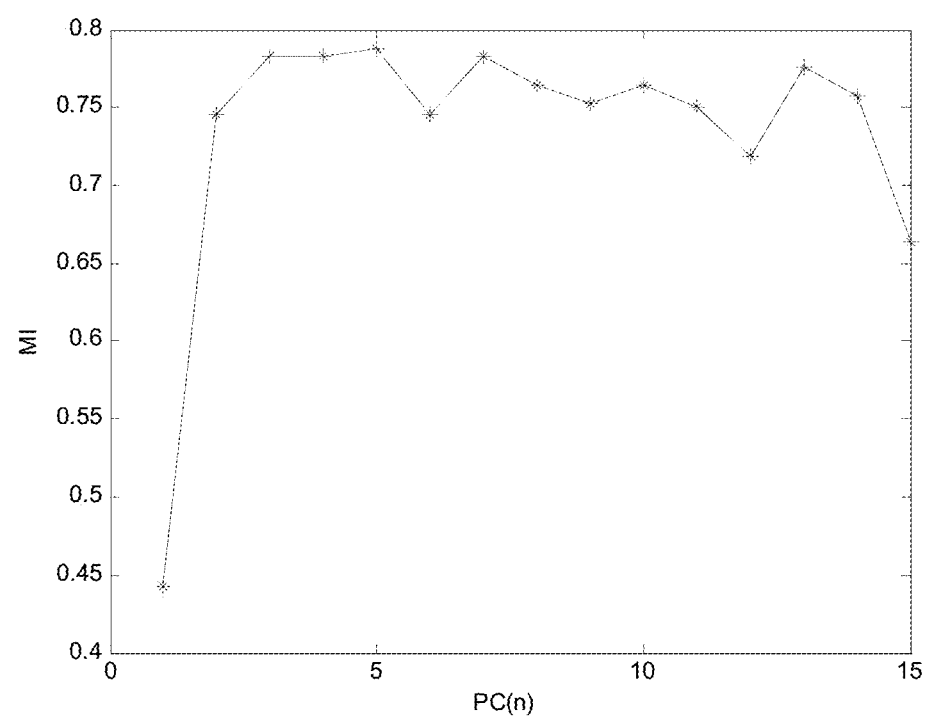
FIG. 4(g) shows MI value between the primarily selected latent features of the MSWI system and DXN.
Figure 5A:
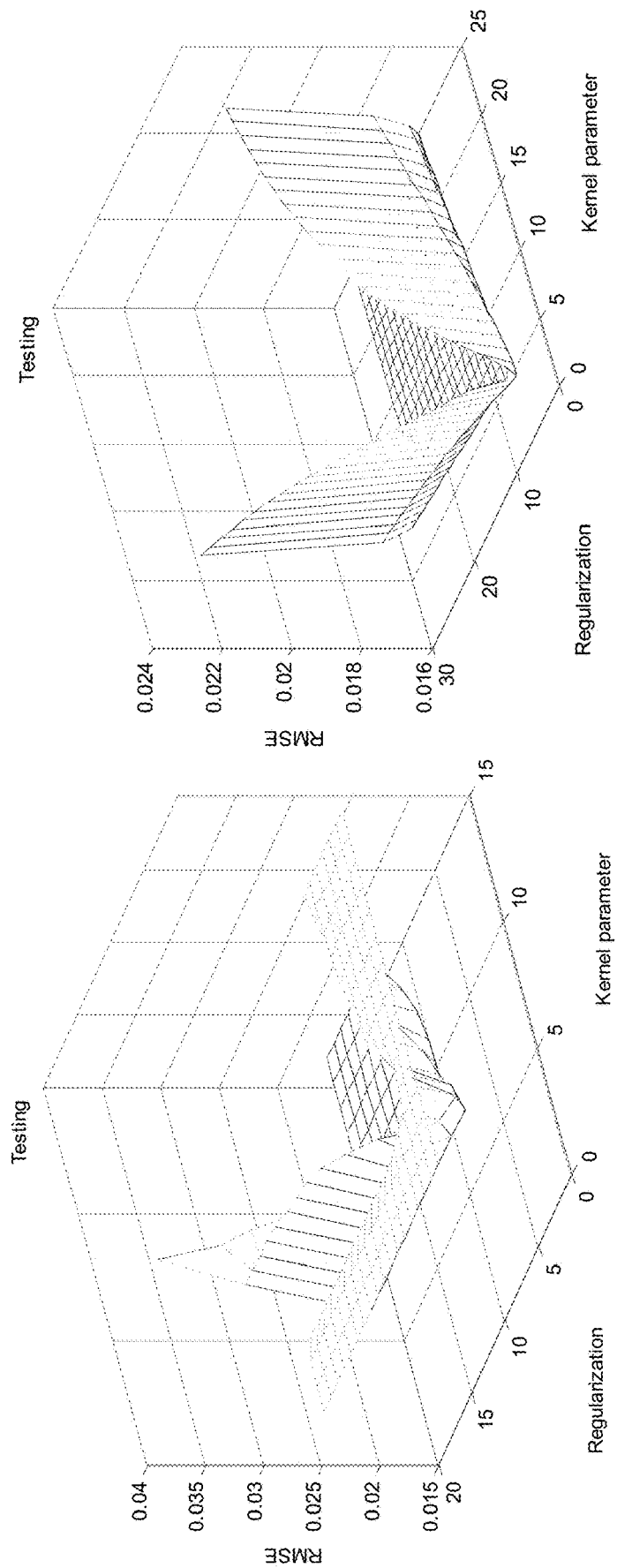
FIG. 5(a) shows the first and second curves of the hyperparameter adaptive optimization of the incineration sub-model.
Figure 5B:
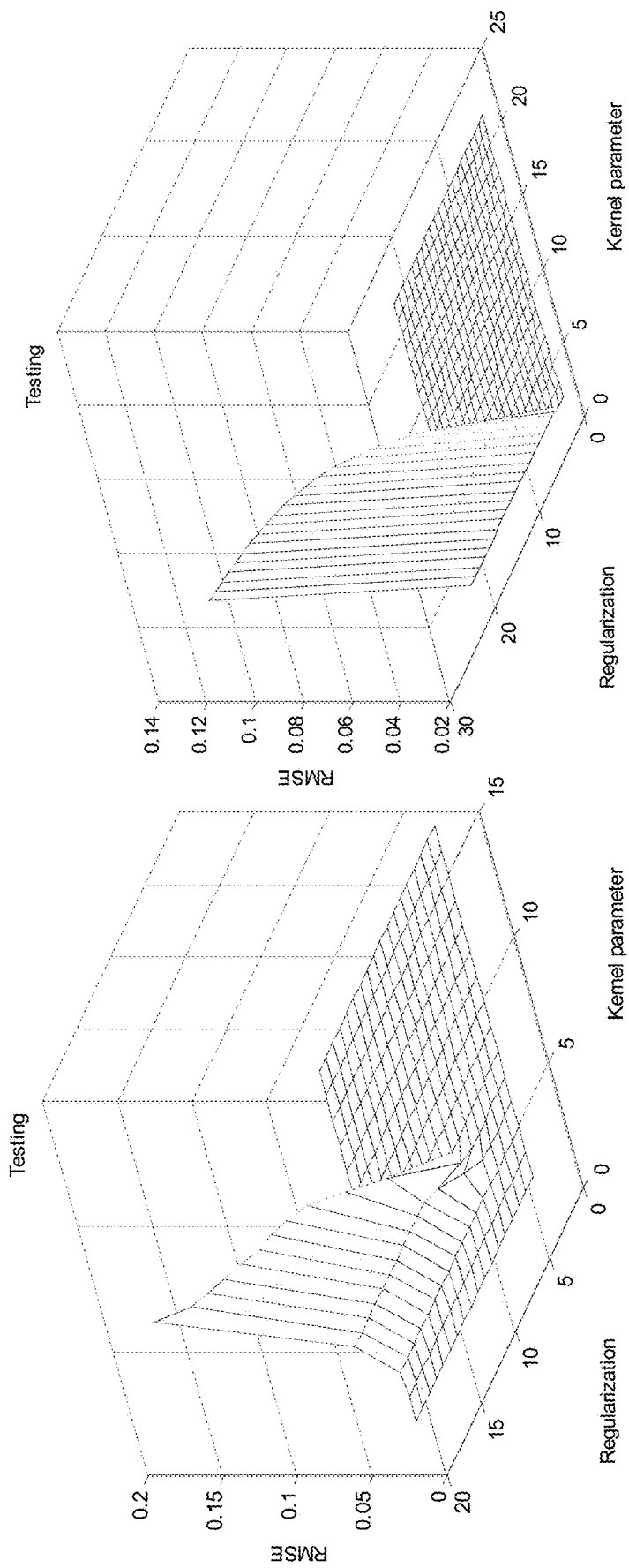
FIG. 5(b) shows The first and second curves of the super-parameter adaptive optimization of the boiler sub-model.
Figure 5C:
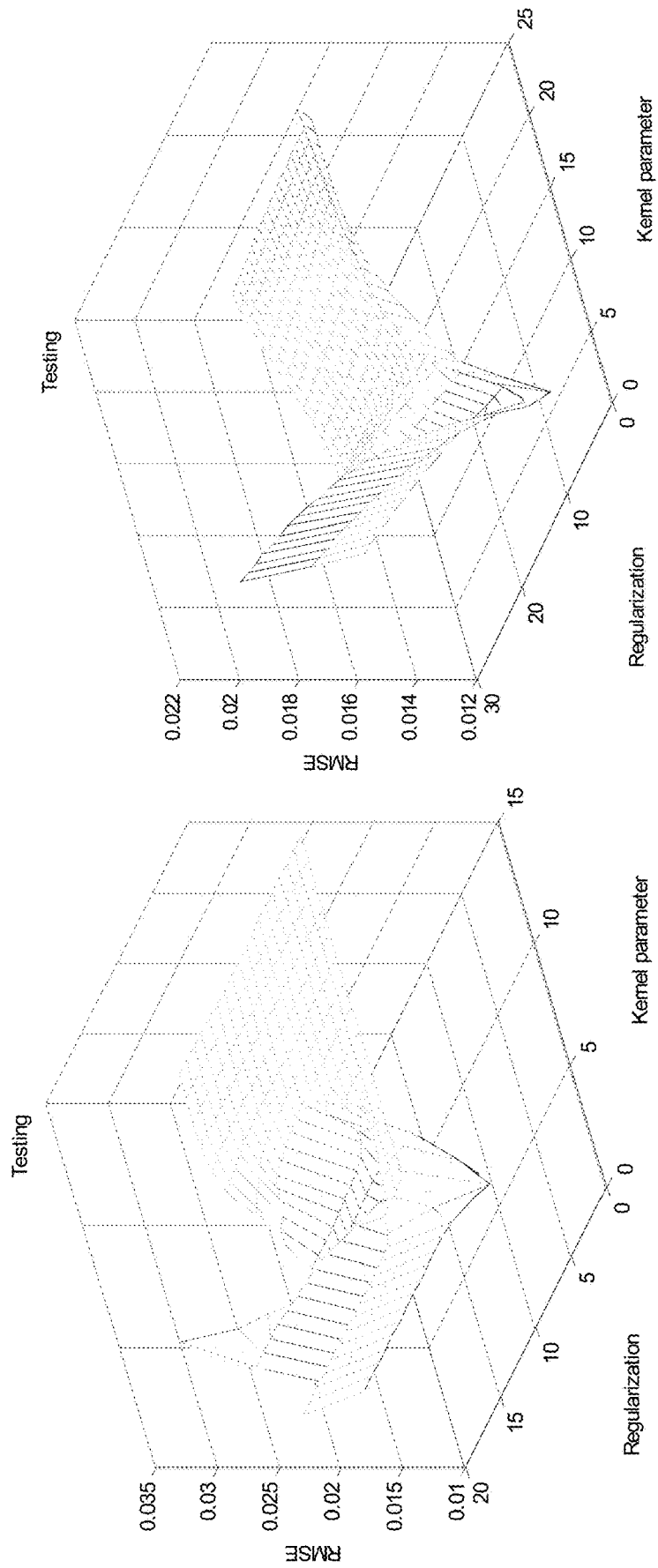
FIG. 5(c) shows the 1st and 2nd curves of the hyperparameter adaptive optimization of the flue gas treatment sub-model.
Figure 5D:
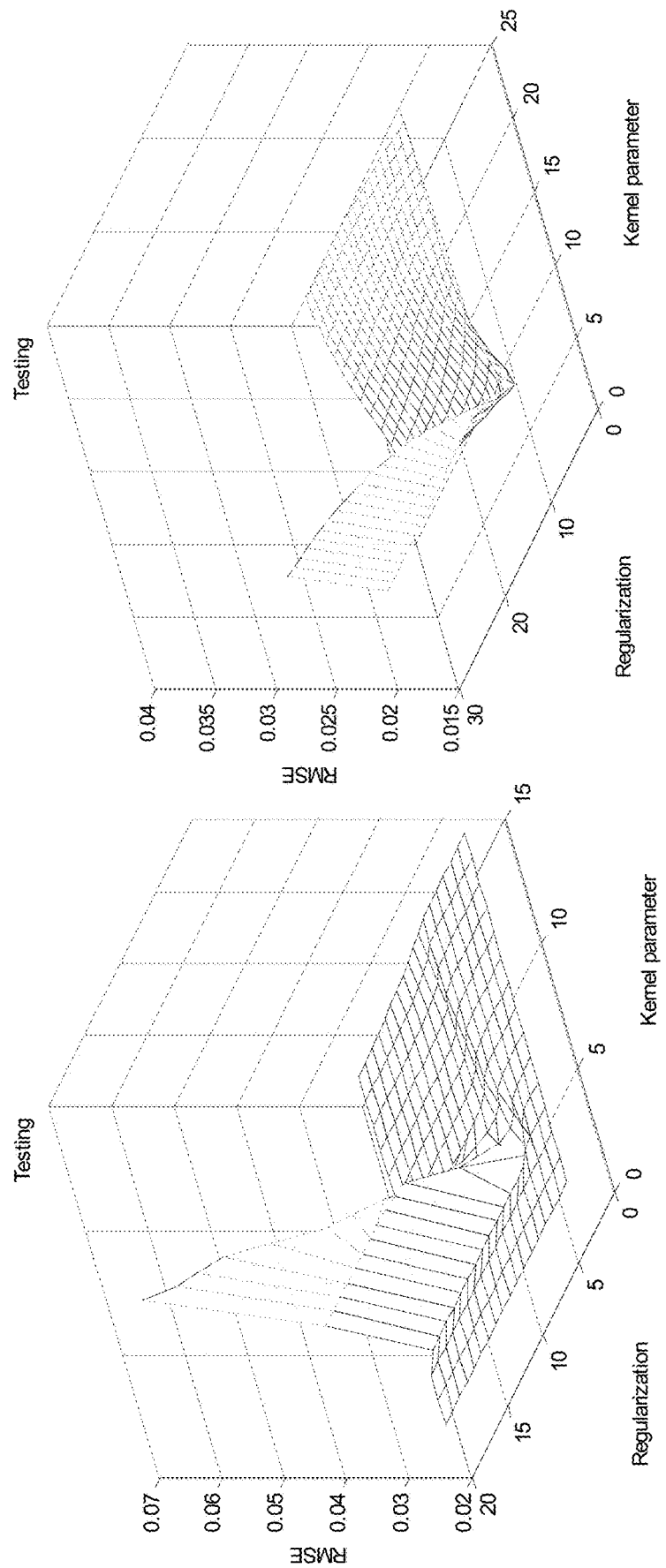
FIG. 5(d) shows the first and second curves of the hyperparameter adaptive optimization of the steam power generation sub-model.
Figure 5E:
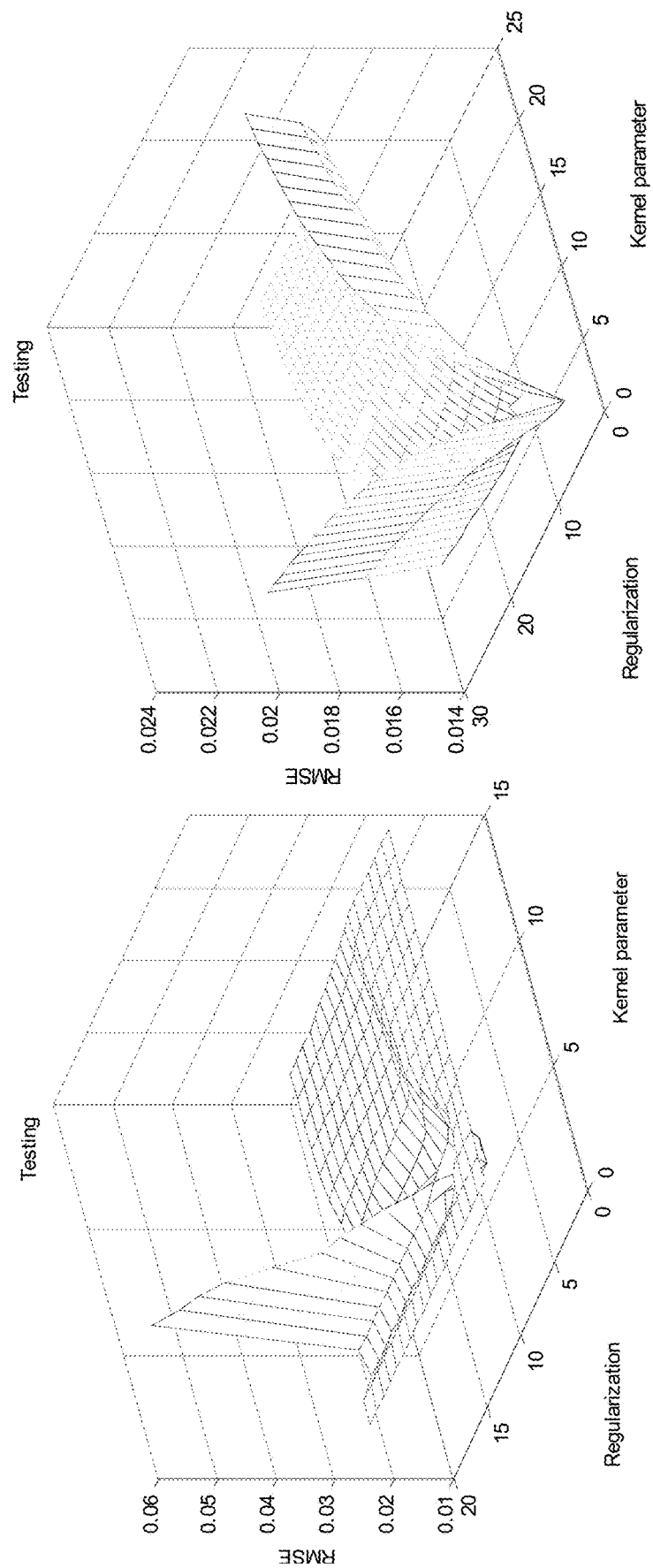
FIG. 5(e) shows the first and second curves of the hyperparameter adaptive optimization of the stack emission sub-model.
Figure 5F:
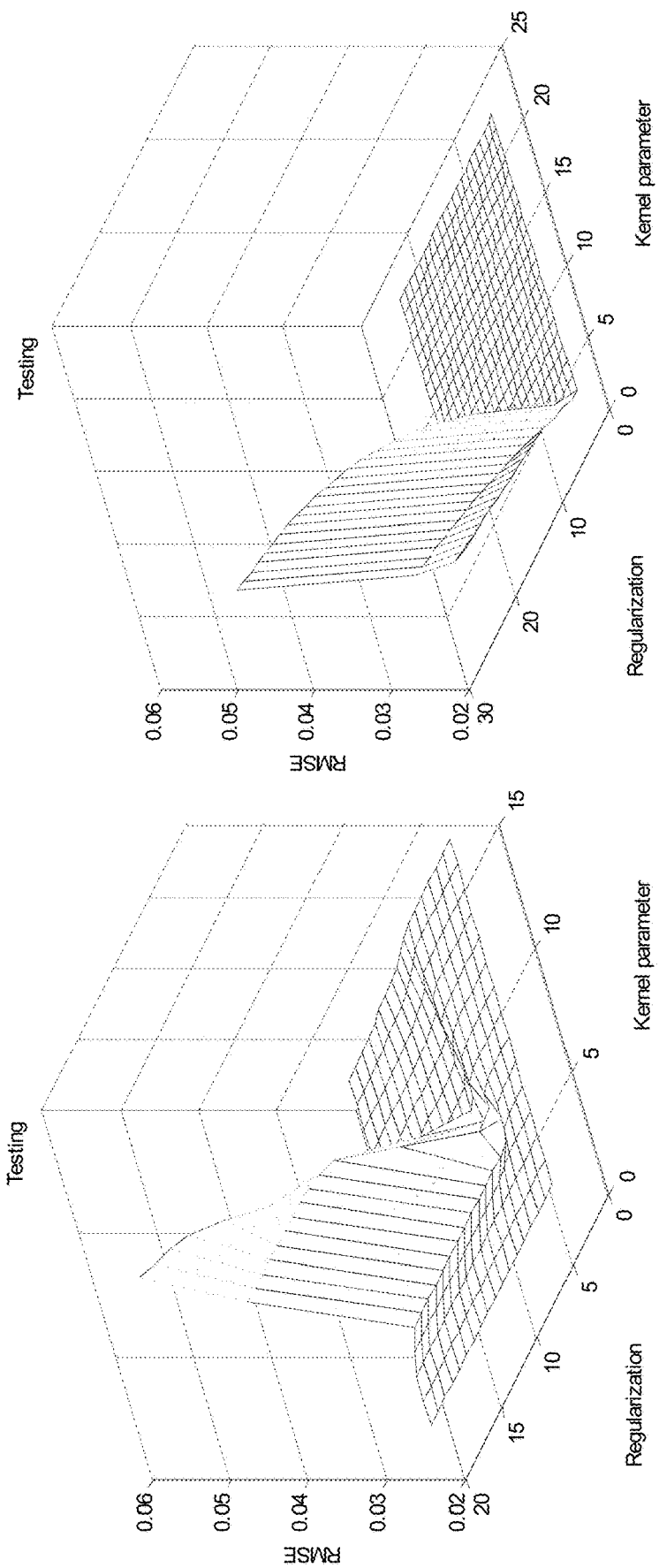
FIG. 5(f) shows the first and second curves of the hyper-parameter adaptive optimization of common engineering sub-model.
Figure 5G:
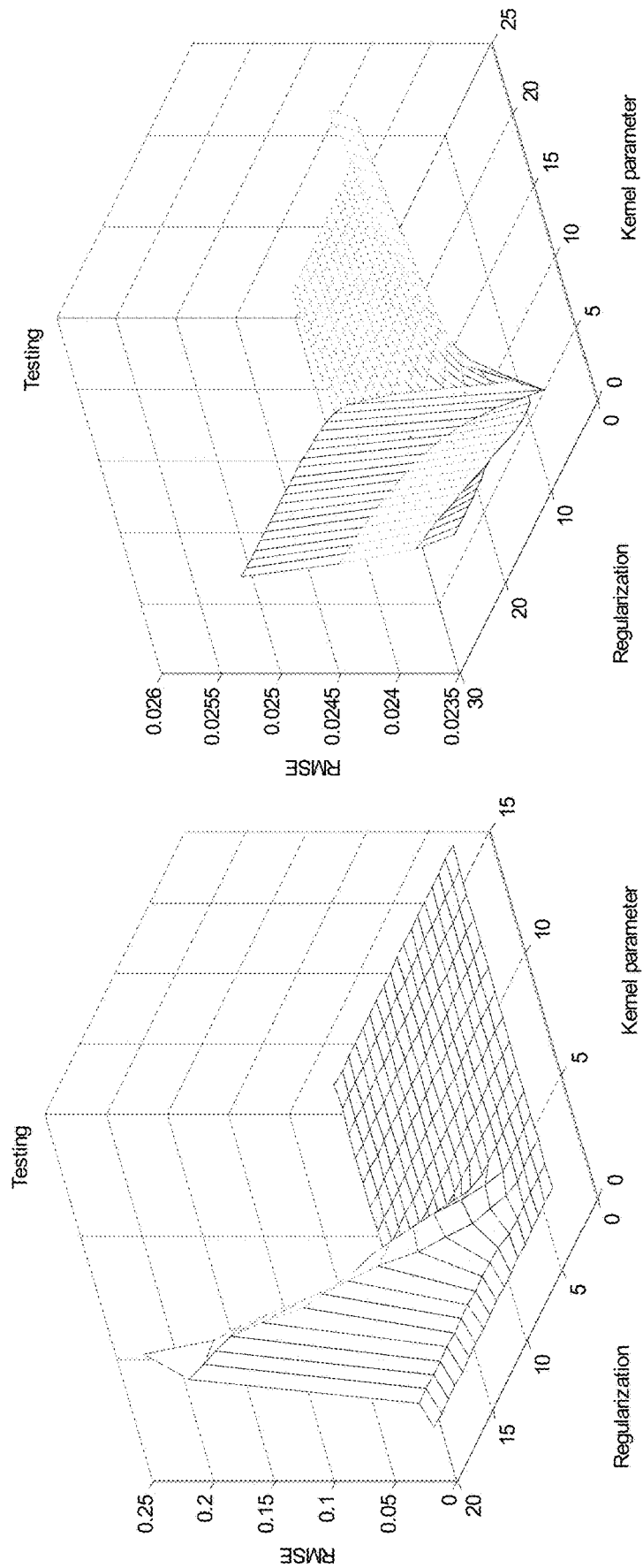
FIG. 5(g) shows the first and second curves of the hyperparameter adaptive optimization of the MSWI system sub-model.

The cumulative contribution rate of the first 6 latent features of 7 subsystems extracted by PCA is shown in FIG. 3.

FIG. 3 shows that the contribution rate of the first 6 PCs reaches 80%, and the contribution rates extracted by the latent variables of different subsystems are different.

Based on the criterion that the contribution rate of a single PC is not less than 1%, the number of primary features and their contribution rates are shown in Table 1.

TABLE 1

| The number of principal features and their contribution rate | | | | | | | |
|---|---|---|---|---|---|---|---|
| principal feature number | Incinerator 13 | Boiler 6 | Flue gas 9 | Steam 8 | Stack 6 | Common 12 | MSWI 15 |
| No. 1 | 29.90 | 70.99 | 54.57 | 63.34 | 42.91 | 46.33 | 43.58 |
| 2 | 21.75 | 12.66 | 10.42 | 16.56 | 18.06 | 14.10 | 13.40 |
| 3 | 11.14 | 6.058 | 8.901 | 7.691 | 17.30 | 8.653 | 8.761 |
| 4 | 6.952 | 5.014 | 7.146 | 3.906 | 12.65 | 6.798 | 5.921 |
| 5 | 6.635 | 3.036 | 5.041 | 2.030 | 7.211 | 4.483 | 4.822 |
| 6 | 5.075 | 1.356 | 4.269 | 1.533 | 1.854 | 4.221 | 3.246 |
| 7 | 3.792 | — | 3.237 | 1.184 | — | 3.501 | 3.071 |
| 8 | 3.208 | — | 2.584 | 1.007 | — | 2.842 | 2.919 |
| 9 | 2.784 | — | 1.190 | — | — | 2.116 | 2.444 |
| 10 | 1.846 | — | — | — | — | 1.494 | 2.138 |
| 11 | 1.514 | — | — | — | — | 1.256 | 1.911 |
| 12 | 1.283 | — | — | — | — | 1.164 | 1.731 |
| 13 | 1.129 | — | — | — | — | — | 1.481 |
| 14 | — | — | — | — | — | — | 1.344 |
| 15 | — | — | — | — | — | — | 1.068 |

It can be seen from Table 1 that the number of latent features selected by different subsystems is 13, 6, 9, 8, 6, 12, and 15. Since PCA belongs to an unsupervised feature extraction method, these extracted features only describe the change of input data, and the mapping relationship between it and DXN needs to be further measured.

Latent Feature Evaluation and Reselection Results

The MI method is used to measure the mapping relationship between the primary features extracted for different subsystems and the DXN, which is shown in FIG. 4.

FIG. 4 shows that: (1) MI value of the first latent feature selected by all subsystems that can characterize the largest change in the process variable of the subsystem is the smallest, indicating that the correlation between these latent features and the DXN emission concentration is relatively weak; (2) Except for the first latent feature, although the contribution rate of other latent features in the process variable characterization is gradually decreasing, there is no obvious rule to follow in characterizing MI value; (3) from the mechanism analysis, Incinerator, Flue gas and Stack emission subsystems are most relevant to the generation, absorption and emission of DXN, but MI values of latent features extracted by these subsystems are less different from other subsystems. It can be seen that there are limitations in making decisions based solely on MI values. The maximum and minimum values of MI values of primary features of different subsystems are shown in Table 2.

TABLE 2

The maximum and minimum set of MI values of primary features of different subsystems:

|  | The maximum value set | | | The minimum value set | | |
| --- | --- | --- | --- | --- | --- | --- |
|  | MI value | Contribution Rate (%) | PC number | MI value | Contribution (%) | PC number |
| Incineration | 0.8559 | 1.514 | 11 | 0.6814 | 29.90 | 1 |
| Boiler | 0.8019 | 3.036 | 5 | 0.5527 | 70.99 | 1 |
| Flue gas | 0.8316 | 10.42 | 2 | 0.6084 | 54.57 | 1 |
| Steam | 0.8249 | 7.691 | 3 | 0.6059 | 63.34 | 1 |
| Stack | 0.8067 | 17.30 | 3 | 0.7182 | 42.91 | 1 |
| Common | 0.8613 | 4.221 | 6 | 0.5400 | 46.33 | 1 |
| MSWI | 0.7882 | 4.822 | 5 | 0.4429 | 43.58 | 1 |

Table 2 shows that: (1) For the maximum value set: the maximum value is derived from a Common subsystem that is theoretically not directly related to DXN emissions, and the value is 0.8613. Whether it is reasonable needs to be further combined with the model prediction results verification; the second place is the Incinerator subsystem, which has a value of 0.8559. This latent variable is theoretically related to the generation of DXN, which is more reasonable; (2) For the minimum set: the minimum is derived from incineration (MSWI) subsystem, which is 0.4429, indicating that separate analysis for different subsystems is still necessary; the maximum value comes from the stack subsystem of the flue gas emission (Stack), which is 0.7182, because other emissions are between DXN and If there is a correlation, this value is more reasonable.

As can be seen from Table 2, the upper limit of the MI threshold is 0.7882, the lower limit is 0.7182, and the step size is 0.006999. Combining the upper and lower limits of the threshold and the step size to determine the final threshold is 0.7882. Twice selection of the number and MI value of latent features are shown in Table 3.

TABLE 3 twice selection of the number and MI value of latent features

|  | amount | MI value | | | | |
| --- | --- | --- | --- | --- | --- | --- |
| Incineration | 5 | 0.7952 | 0.8267 | 0.8258 | 0.8559 | 0.8088 | — |
| Boiler | 2 | 0.8019 | 0.7952 | — | — | — | — |
| Flue gas | 1 | 0.8316 | — | — | — | — | — |
| Steam | 3 | 0.8249 | 0.8022 | 0.8019 | — | — | — |
| Stack | 2 | 0.7952 | 0.8067 | — | — | — | — |
| Common | 6 | 0.8019 | 0.8613 | 0.8088 | 0.7904 | 0.8383 | 0.8316 |
| MSWI | 1 | 0.7882 | — | — | — | — | — |

Adaptive Selection Ensemble Modeling

In the present invention, the set of candidate regularization parameters and kernel parameters are pre-selected as {0.0001, 0.001, 0.01, 0.1, 1, 10, 100, 1000, 2000, 4000, 6000, 8000, 10000, 20000, 40000, 60000, 80000, 160000} and {0.0001, 0.001, 0.01, 0.1, 1, 10, 100, 1000, 1600, 3200, 6400, 12800, 25600, 51200, 102400}.

Based on the above, the number of input features of the Incineration, Boiler, Flue gas, Steam, Stack, Common, and MSWI whole process sub-models are 5, 2, 1, 3, 2, 6, and 1, respectively. The first and second curves of the hyperparameter adaptive optimization using grid search method are shown in FIG. 5.

Based on the above results, hyperparameter pairs adaptively selected by the above sub-models are {109,109}, {10000,25.75}, {5.950,0.0595}, {30.70,2.080}, {5.950, 0.5950}, {1520800,22816} {1362400,158.5}, the corresponding root mean square error (RMSE) of the test data is 0.01676, 0.02302, 0.01348, 0.01943, 0.01475, 0.02261 and 0.02375.

Using optimization and weighting strategy based on BB and prediction error information entropy weighting algorithm, the test errors of SEN model constructed when integration size is 2-6 are 0.01345, 0.01332, 0.01401, 0.01460 and 0.01560, respectively. The final ensemble size of DXN soft measurement model is 3, and the corresponding subsystems of selected sub-model are flue gas treatment, stack emission and incineration. In theory, these three subsystems are related to absorption, emission and generation of DXN. From the results of present invention, validity of all algorithms is verified, and availability of data is also indicated.

Comparing Results

The comparison with usual PLS single model, PCA-LSSVM single model and different weighting methods is shown in Table 4.

TABLE 4

Results statistics of different modeling methods

| method | Weighted Method | RMSE | Parameters (LV/PC) ($\{K_{er}, R_{eg}\}$) | Remarks |
| --- | --- | --- | --- | --- |
| PLS | — | 0.01790 | LV = 13 | single model, MSWI |

TABLE 4-continued

Results statistics of different modeling methods

| method | Weighted Method | RMSE | Parameters (LV/PC) ($I_{Ker}, R_{eg}$) | Remarks |
|---|---|---|---|---|
| PCA-LSSVM | — | 0.01563 | (18)({36240, 83904}) | single model, MSWI |
| Present disclosure | — | 0.01348 | (1)({5.950, 0.0595}) | Optimal sub-model, Flue gas |
| | PLS | 0.01420 | (1)(—) | EN, All subsystems |
| | AWF | 0.01851 | (—)(—) | EN, All subsystems |
| | BB-AWF | 0.01348 | (—)(—) | SEN, (Flue gas, Stack, Incinerator) |
| | Entropy | 0.01625 | (—)(—) | EN, All subsystems |
| | BB-Entropy | 0.01332 | (—)(—) | SEN, (Flue gas, Stack, Incinerator) |

Table 3 shows that the prediction performance of DXN single model based on PLS and PCA-LSSVM constructed with all process variables is weaker than SEN modeling method proposed by the present invention, indicating that the strategy of building a SEN model based on multi-source features is effective. The method of ensemble all sub-models adopts the PLS weighted method that is stronger than other ensemble (EN) all sub-models, indicating that the PLS algorithm is better in eliminating the collinearity of sub-models; in addition, the subsystem corresponding to sub-model selected by SEN model are related to the generation, absorption and emission mechanism of DXN, indicating the availability of modeling data and the effectiveness of the algorithm.

The invention based on industrial process data of an incineration enterprise in Beijing, and uses latent feature extraction and primary selection based on PCA and prior knowledge, primary latent feature evaluation and selection based on MI and prior knowledge, and self-adaptive latent feature-oriented adaptation based on SEN modeling mechanism, a soft measurement of DXN emission concentration based on multi-source latent feature SEN modeling is proposed, and the simulation verifies the effectiveness of proposed method. The adjustment of contribution rate threshold, MI threshold, hyperparameters, and SEN model structure combined with the soft measurement model's predicted performance adaptive adjustment still needs further study. In addition, the analysis of combined DXN emission mechanism also needs to be carried out in depth.

What is claimed is:

1. A soft measurement method of dioxin emission concentration in a municipal solid waste incineration (MSWI) process, comprising steps of:

using a latent feature extraction and primary selection module to divide data associated with the municipal solid waste incineration process into subsystems of different sources according to industrial processes;

using a principal component analysis (PCA) to separately extract latent features of the subsystems;

conducting a primary selection of the latent features according to a threshold value of a principal component contribution rate preset by experience;

using a latent feature evaluation and reselection module, measuring, based on mutual information (MI), a correlation between the latent features selected via the primary selection and dioxin (DXN);

adaptively determining an upper limit, a lower limit and thresholds of reselection of the latent features; and using an adaptive selective ensemble modeling module, further comprising:

based on latent feature reselection, using a least squares-support vector machine (LS-SVM) algorithm with a hyperparameter adaptive selection mechanism to establish DXN emission concentration sub-models for different subsystems; and adopting a strategy optimization based on a branch and bound (BB) and a prediction error information entropy weighting algorithm to select the DXN emission concentration sub-models and calculating weight coefficients to construct a DXN emission concentration selective ensemble soft measurement model, wherein the DXN emission concentration selective ensemble (SEN) soft measurement model is used to optimize the municipal solid waste incineration process to reduce emission of the DXN by the municipal solid waste incineration process.

2. The soft measurement method of dioxin emission concentration in the municipal solid waste incineration process according to claim 1, wherein the step of using the latent feature extraction and primary selection module further comprises the steps of:

for an ith subsystem, using the PCA to extract the latent features of high-dimensional input process variables comprising normalizing input data $X^i$ to mean=0 and variance=1, and decomposing $X^i$ into:

$$X^i = t_{1_{FeAll}}^i (p_{1_{FeAll}}^i)^T + L + t_{m_{FeAll}}^i (p_{m_{FeAll}}^i)^T + L + t_{M_{FeAll}}^i (p_{M_{FeAll}}^i)^T \quad (3);$$

wherein, $t_{m_{FeAll}}^i$ and $p_{m_{FeAll}}^i$ represent a score and load vector of $m_{FeAll}$th principal component (PC), T represents a transpose, and $m_{FeAll}$th represents a number of the latent features extracted for the ith subsystem, with a calculation formula as follows:

$$M_{FeAll}^i = \text{rank}(X^i) \quad (4);$$

wherein based on the calculation formula, all the latent features extracted from the input data $X^i$ are expressed as:

$$T^i = [t_{1_{FeAll}}^i, L, t_{m_{FeAll}}^i, L, t_{M_{FeAll}}^i] \quad (5)$$

Wherein, $T^i \in R^{N \times M_{FeAll}^i}$ represents a score matrix, which is an orthogonal mapping of the input data $X^i$ in a direction of a load matrix $P^i$, wherein $P^i$ is expressed by formula:

$$P^i = [p_{1_{FeAll}}^i, L, p_{m_{FeAll}}^i, L, p_{M_{FeAll}}^i] \quad (6);$$

wherein $P^i \in R^{M \times M_{FeAll}^i}$, wherein the latent features extracted from the input data $X^i$ are further expressed as:

$$Z_{FeAll}^i = T^i = X^i P^i \quad (7)$$

$$= \left[ z_{1_{FeAll}}^i, L, z_{m_{FeAll}^i}^i, L, z_{M_{FeAll}^i}^i \right]$$

$$= \left[ \{(z_{1_{FeAll}}^i)_n\}_{n=1}^N, L, \{(z_{m_{FeAll}^i}^i)_n\}_{n=1}^N, L, \{(z_{M_{FeAll}^i}^i)_n\}_{n=1}^N \right];$$

$$= \{(z_{FeAll}^i)_n\}_{n=1}^N$$

wherein $Z_{FeAll}^i \in R^{N \times M_{FeAll}^i}$, wherein all the latent features are further expressed as:

$$Z_{FeAll} = [Z_{FeAll}^1, L, Z_{FeAll}^i, L, Z_{FeAll}^I] = \{Z_{FeAll}^i\}_{i=1}^I \quad (8);$$

a feature vector corresponding to the $m_{FeAll}$th load vector $p_{m_{FeAll}}^i$ is recorded as $\lambda_{m_{FeAll}}^i$, a contribution rate $\theta_{m_{FeAll}}^i$ corresponding to $m_{FeAll}$th latent feature $z_{m_{FeAll}}^i$ is calculated using formula:

$$\theta^i_{m^i_{FeAll}} = \frac{\lambda^i_{m^i_{FeAll}}}{\sum_{m^i_{FeAll}=1}^{M^i_{FeAll}} \lambda^i_{m^i_{FeAll}}} \times 100; \quad (9)$$

wherein a threshold preset by experience is recorded as $\theta_{Contri}$, with a default value being 1, where the primary selection of the latent features is performed using rules:

$$\xi^i_{m^i_{FeAll}} = \begin{cases} 1, & \text{if } \theta^i_{m^i_{FeAll}} \geq \theta_{Contri} \\ 0, & \text{else } \theta^i_{m^i_{FeAll}} < \theta_{Contri} \end{cases}; \quad (10)$$

wherein, $\xi_{m_{FeAll}}{}^i$ represents a mark value denoting whether the $m_{FeAll}$th latent feature is selected, and a value of 1 indicates that the latent feature is selected for the primary selection; wherein, the latent features of the primary selection for the ith subsystem are expressed as:

$$Z^i_{FeSe1st} = \left[ z^i_{1_{FeSe1st}}, L, z^i_{m^i_{FeSe1st}}, L, z^i_{M^i_{FeSe1st}} \right] = \quad (11)$$

$$\left[ \{(z^i_{1_{FeSe1st}})_n\}_{n=1}^N, L, \right.$$

$$\left. \{(z^i_{m^i_{FeSe1st}})_n\}_{n=1}^N, L, \{(z^i_{M^i_{FeSe1st}})_n\}_{n=1}^N \right] = \{(z^j_{FeSe1st})_n\}_{n=1}^N;$$

wherein, all the latent features from the primary selection $Z_{FeSe1st}$ are expressed as:

$$Z_{FeSe1st} = [Z_{FeSe1st}^1, L, Z_{FeSe1st}^i, L,$$
$$Z_{FeSe1st}^I] = \{Z_{FeSe1st}^i\}_{i=1}^I \quad (12).$$

3. The soft measurement method of dioxin emission concentration in municipal solid waste incineration process according to claim 1, wherein using the latent feature evaluation and reselection module further comprises the steps of:

for an ith subsystem, a mutual information (MI) value between each primary feature $z_{m_{FeSe1st}}{}^i$ and the DXN emission concentration is marked as $\xi_{MI}{}^{m_{FeSe1st}^i}$ and calculated using formula:

$$\xi^{m^i_{FeSe1st}}_{MI} = \quad (13)$$

$$\int \int p_{prob}(z^{m^i_{FeSe1st}}, y) \log \left( \frac{p_{prob}(z^{m^i_{FeSe1st}}, y)}{p_{prob}(z^{m^i_{FeSe1st}}) p_{prob}(y)} \right) d(z^{m^i_{FeSe1st}}) dy =$$

$$H(y) - H(y|z^{m^i_{FeSe1st}});$$

wherein, $p_{prob}(z^{m_{FeSe1st}^i})$ and $p_{prob}(y)$ represent a marginal probability density of $z_{prob}(z^{m_{FeSe1st}^i})$ and y, $p_{prob}(z^{m_{FeSe1st}^i}, y)$ represents a joint probability density, $H(y|z_{prob}(z^{m_{FeSe1st}^i}))$ represents a conditional entropy, and $H(y)$ represents an information entropy;

adaptively determining a threshold of reselection of the latent features according to a prediction performance of the DXN emission concentration SEN soft measurement model, which further comprises the steps of:

calculating the upper limit of the threshold $\theta_{Contri}^{Uplimit}$, the lower limit of the threshold $\theta_{Contri}^{Downlimit}$ and a fixed step size $\theta_{Contri}^{Step}$ using formulas:

$$\theta^{Uplimit}_{Contri} = \min\left(\max\left(\xi^{m^i_{FeSe1st}}_{MI}\right), L, \max\left(\xi^{m^i_{FeSe1st}}_{MI}\right), L, \max\left(\xi^{m^i_{FeSe1st}}_{MI}\right)\right); \quad (14)$$

$$\theta^{Downlimit}_{Contri} = \max\left(\min\left(\xi^{m^i_{FeSe1st}}_{MI}\right), L, \min\left(\xi^{m^i_{FeSe1st}}_{MI}\right), L, \min\left(\xi^{m^i_{FeSe1st}}_{MI}\right)\right); \quad (15)$$

$$\theta^{Step}_{Contri} = \frac{\theta^{Uplimit}_{Contri} - \theta^{Downlimit}_{Contri}}{N^{Step}_{Contri}}; \quad (16)$$

wherein functions max(•) and min(•) represent taking maximum and minimum values respectively; $N_{Contri}^{Step}$ represents a number of candidate thresholds preset by experience, and a default value is 10; and recording the determined threshold as $\theta_{Contri}$, and adaptively selecting between $\theta_{Contri}^{Uplimit}$ and $\theta_{Contri}^{Downlimit}$ based on the prediction performance of the DXN emission concentration SEN soft measurement model;

using following rules to reselect the latent features of the primary selection:

$$\xi^i_{m^i_{FeSe1st}} = \begin{cases} 1, & \text{if } \xi^{m^i_{FeSe1st}}_{MI} \geq \theta_{Contri} \\ 0, & \text{else } \xi^{m^i_{FeSe1st}}_{MI} < \theta_{Contri} \end{cases}; \quad (17)$$

wherein, $\xi_{m_{FeSe1st}}{}^i$ represents a mark value of whether the $m_{FeSe1st}$th latent feature is selected, and a value of 1 indicates that the latent feature is selected again;

expressing the reselected latent features for the ith subsystem as:

$$Z^i_{FeSe2nd} = \left[ z^i_{1_{FeSe2nd}}, L, z^i_{m^i_{FeSe2nd}}, L, z^i_{M^i_{FeSe2nd}} \right] = \quad (18)$$

$$\left[ \{(z^i_{1_{FeSe2nd}})_n\}_{n=1}^N, L, \{(z^i_{m^i_{FeSe2nd}})_n\}_{n=1}^N, L, \{(z^i_{M^i_{FeSe2nd}})_n\}_{n=1}^N \right] =$$

$$\{(z^i_{FeSe2nd})_n\}_{n=1}^N; \text{ and}$$

expressing all the reselected latent features $Z_{FeSe2nd}$ as:

$$Z_{FeSe2nd} = [Z_{FeSe2nd}^1, L, Z_{FeSe2nd}^i, L,$$
$$Z_{FeSe2nd}^I] = \{Z_{FeSe2nd}^i\}_{i=1}^I \quad (19).$$

4. The soft measurement method of dioxin emission concentration in the municipal solid waste incineration process according to claim 1, wherein the step of using the adaptive selective ensemble modeling module further comprises the steps of:

for an ith subsystem, describing a process of constructing a DXN emission concentration sub-model based on a reselection of the latent features $Z_{FeSe2nd}{}^i$ and modeling hyperparameter pairs $\{K_{er}{}^i, R_{eg}{}^i\}$, further comprising:

transforming a reselected latent feature $\{(z_{FeSe2nd}{}^i)_n\}n=1^N$ into a high-dimensional feature space by mapping $\varphi(•)$, and subsequently solving a following optimization problem:

$$\begin{cases} \min_{w^i, b^i} O_{LS-SVM} = \frac{1}{2}(w^i)^T w^i + \frac{1}{2} R_{eg}^i \sum_{n=1}^{N} (\zeta_n^i)^2 \\ \text{s.t.}: \quad \hat{y}_n^i = (w^i)^T \varphi((z_{FeSe2nd}^i)_n) + b^i + \zeta_n^i \end{cases} \quad (20)$$

wherein, $w^i$ represents a weight coefficient, $b^i$ represents an offset, and $\zeta_n^i$ is a prediction error of an nth sample;

using Lagrangian method to obtain formula:

$$L^i(w^i, b^i, \zeta^i, \beta^i) = \frac{1}{2}(w^i)^T w^i + \frac{1}{2}\sum_{n=1}^{N}(\zeta_n^i)^2 - \sum_{n=1}^{N}\beta_n^i[(w^i)^T \varphi((z_{FeSe2nd}^i)_n) + b^i + \zeta_n^i - \hat{y}_n^i]; \quad (21)$$

wherein, $\beta^i = [\beta_1^i, L, \beta_n^i, L, \beta_N^i]$ represents a Lagrange operator vector, and $\zeta^i = [\zeta_1^i, L, \zeta_n^i, L, \zeta_N^i]$ represents a prediction error vector;

solving the formula:

$$\frac{\partial L^i}{\partial w^i} = 0, \frac{\partial L^i}{\partial b^i} = 0, \frac{\partial L^i}{\partial \zeta^i} = 0, \frac{\partial L^i}{\partial \beta^i} = 0; \quad (22)$$

expressing an adopted kernel function as follows:

$$\Omega_{ker}^i(z_{FeSe2nd}^i, (z_{FeSe2nd}^i)_n) = <\varphi(z_{FeSe2nd}^i) \cdot \varphi((z_{FeSe2nd}^i)_n)> \quad (23)$$

transforming an LS-SVM problem into solving a linear equation system:

$$\begin{bmatrix} 0 & 1 & L & 1 \\ 1 & \Omega_{ker}^i((z_{FeSe2nd}^i)_1, (z_{FeSe2nd}^i)_1) + \frac{1}{R_{eg}^i} & L & \Omega_{ker}^i((z_{FeSe2nd}^i)_1, (z_{FeSe2nd}^i)_N) \\ M & M & M & M \\ 1 & \Omega_{ker}^i((z_{FeSe2nd}^i)_N, (z_{FeSe2nd}^i)_1) & L & \Omega_{ker}^i((z_{FeSe2nd}^i)_N, (z_{FeSe2nd}^i)_N) + \frac{1}{R_{eg}^i} \end{bmatrix} \cdot \begin{bmatrix} b^i \\ \beta_1^i \\ M \\ \beta_N^i \end{bmatrix} = \begin{bmatrix} 1 \\ y_1^i \\ M \\ y_N^i \end{bmatrix}; \quad (24)$$

solving the linear equation system to obtain $\beta^i$ and $b^i$;
expressing the DXN emission concentration sub-model based on the LS-SVM problem as:

$$\hat{y}^i = \sum_{n=1}^{N} \beta_n^i \cdot \Omega_{ker}^i(z_{FeSe2nd}^j, (z_{FeSe2nd}^j)_n) + b^i; \quad (25)$$

wherein the hyperparameter adaptive selection mechanism of the DXN emission concentration sub-model is implemented using the following two steps:

step 1: adopting a grid search strategy with a prediction performance of the DXN emission concentration sub-model as an objective function, and adaptively selecting an initial hyperparameter pair $\{(K_{er}^{initial})^i, (R_{eg}^{initial})^i\}$ in a candidate hyperparameter matrix $M_{para}$, wherein the candidate hyperparameter matrix $M_{para}$ is expressed as follows:

$$M_{para} = \begin{bmatrix} [K_{er}^1, R_{eg}^1] & L & [K_{er}^1, R_{eg}^r] & L & [K_{er}^1, R_{eg}^R] \\ M & M & M & M & M \\ [K_{er}^k, R_{eg}^1] & L & [K_{er}^k, R_{eg}^r] & L & [K_{er}^k, R_{eg}^R] \\ M & M & M & M & M \\ [K_{er}^K, R_{eg}^1] & L & [K_{er}^K, R_{eg}^r] & L & [K_{er}^K, R_{eg}^R] \end{bmatrix}; \quad (26)$$

where $k=1,L,K$ $K$ represent a number of candidate kernel parameters; $r=1,L,R$ represents a number of candidate penalty parameters; $[K_{er}^k, R_{eg}^r]$ represents a kth kernel parameter and rth penalty parameter, a formed hyperparameter pair also is a jth parameter pair in the candidate hyperparameter matrix $M_{para}$, that is, there are $M_{para}^j = [K_{er}^k, R_{eg}^r]$; $j=1,L,J$, $J=K \times R$ represent a number of all hyperparameter pairs in the candidate hyperparameter matrix $M_{para}$; wherein, a hyperparameter $\{(K_{er}^{initial})^i, (R_{eg}^{initial})^i\}$ selected for a first time using the grid search strategy is an element in the candidate hyperparameter matrix $M_{para}$, i.e., there is the $\{K_{er}^{initial}, R_{eg}^{initial}\} \in M_{para}$;

step 2: based on the $\{(K_{er}^{initial})^i, (R_{eg}^{initial})^i\}$ selected by the step 1, a new set of candidate hyperparameters is obtained using following formulas:

$$(K_{er}^{vector})^i = (K_{er}^{initial})^i / k_{supara}^{down} : \frac{k_{supara}^{up} \times (K_{er}^{initial})^i - (K_{er}^{initial})^i / k_{supara}^{down}}{N_{ker}} : k_{supara}^{up} \times (K_{er}^{initial})^i; \quad (27)$$

-continued $$(R_{eg}^{vector})^i = (R_{eg}^{initial})^i / k_{supara}^{down} : \frac{k_{supara}^{up} \times (R_{eg}^{initial})^i - (R_{eg}^{initial})^i / k_{supara}^{down}}{N_{ker}} : k_{supara}^{up} \times (R_{eg}^{initial})^i; \quad (28)$$

wherein, $(K_{er}^{vector})^i$ and $(R_{eg}^{vector})^i$ represent new candidate hyperparameter sets, corresponding to kernel parameter vector and penalty parameter vector, respectively; $N_{ker}$ and $N_{reg}$ represent a number of new hyperparameters sets based on experience; $k_{supara}^{down}$ and $k_{supara}^{up}$ represent hyperparameter shrinkage and expansion factor based on experience, a default value is 10;

by adopting the grid search strategy, adaptively obtaining the hyperparameter pair of an ith sub-model $\{K_{er}^i, R_{eg}^i\}$;

performing the step 1 and the step 2 for all subsystems, wherein a set of sub-model prediction outputs is expressed as:

$$\hat{Y} = [\hat{y}^1, L, \hat{y}^i, L, \hat{y}^I] = \qquad (29)$$
$$\{\hat{y}^i\}_{i=1}^I = [f^1(K_{er}^1, R_{eg}^1, Z_{FeSe2nd}^1), L, f^1(K_{er}^i, R_{eg}^i, Z_{FeSe2nd}^i),$$
$$L, f^1(K_{er}^I, R_{eg}^I, Z_{FeSe2nd}^I)] = \{f^i(K_{er}^i, R_{eg}^i, Z_{FeSe2nd}^i)\}_{i=1}^I$$

wherein, $f^i(\bullet)$ represents the ith sub-model;

by combining an optimization selection algorithm based on the branch and bound (BB) and the prediction error information entropy weighting algorithm, adaptively optimizing the sub-models and calculating the weight coefficients, wherein given a candidate sub-model and weighting algorithm, an optimal sub-model selection is similar to a weighted optimal feature selection;

for a limited number of candidate sub-models, by running optimization and weighting algorithms multiple times, obtaining SEN models with ensemble sizes of 2 to (I−1); and ranking the optimized SEN models and selecting a best prediction performance model as a final DXN soft measurement model;

wherein assuming an ensemble size of the final DXN soft measurement model is $I_{sel}$, a predicted output value $\hat{y}$ is calculated by formula:

$$\hat{y} = \sum_{i_{sel}=1}^{I_{sel}} W_{i_{sel}} \hat{y}_{i_{sel}} = \sum_{i_{sel}=1}^{I_{sel}} w_{i_{sel}} \cdot f^{i_{sel}}(K_{er}^{i_{sel}}, R_{eg}^{i_{sel}}, Z_{FeSe2nd}^{i_{sel}}). \qquad (30)$$

\* \* \* \* \*